Feb. 13, 1962  J. A. RAJCHMAN  3,021,387
ELECTRICAL DISPLAY DEVICE
Filed April 13, 1956  19 Sheets-Sheet 5
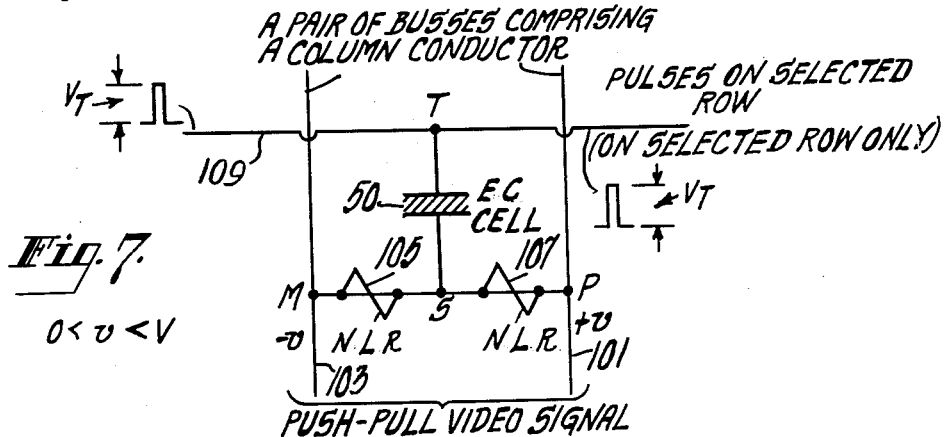
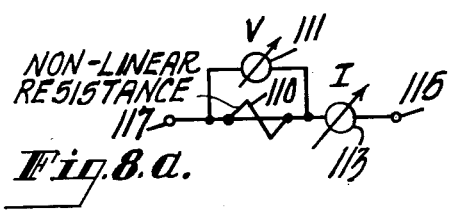
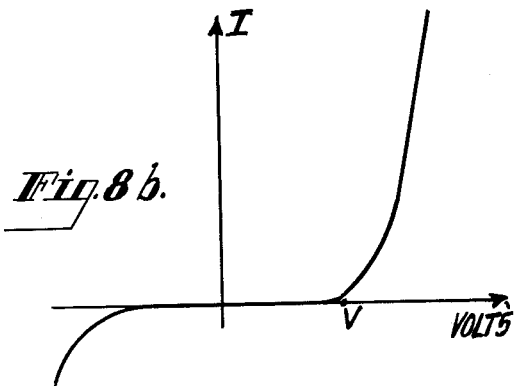
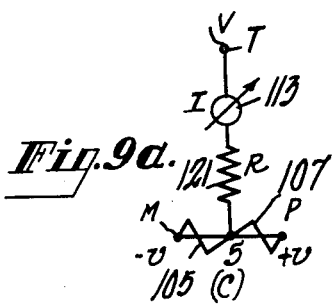
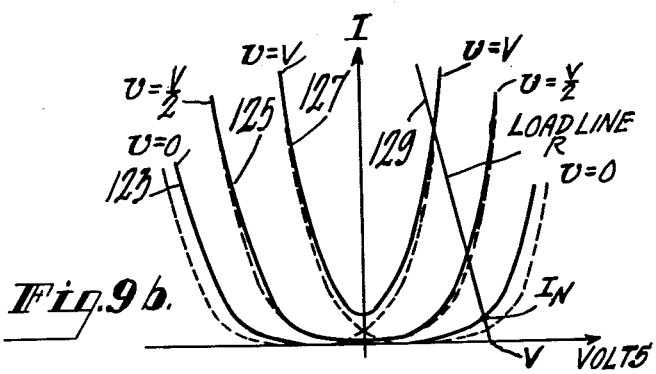
INVENTOR.
JAN A. RAJCHMAN
BY
ATTORNEY

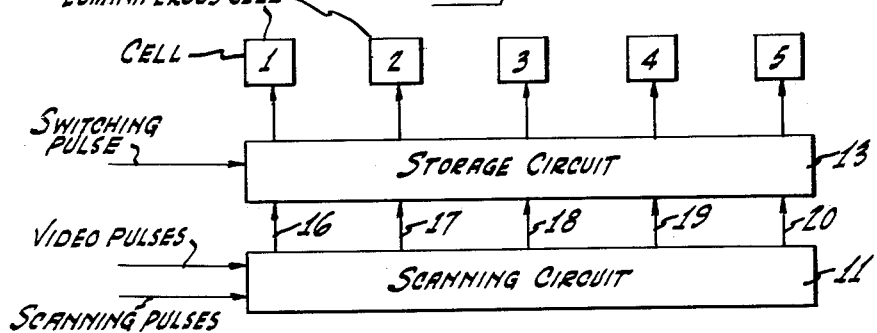
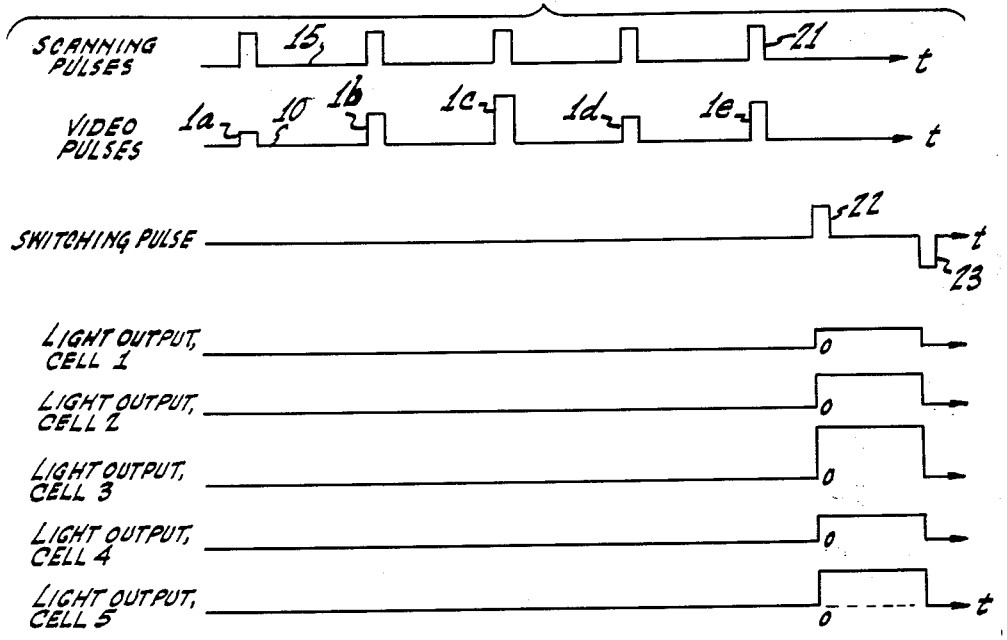

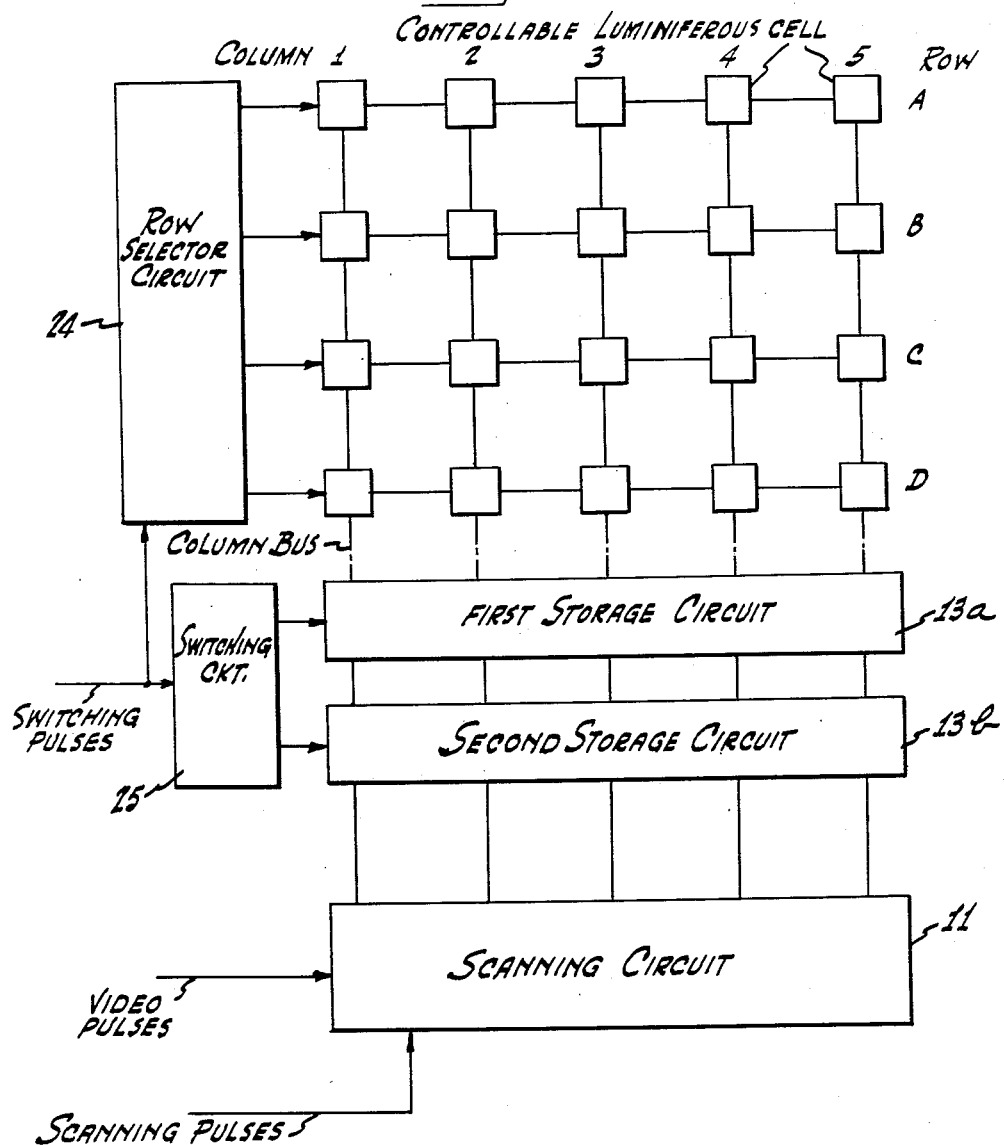

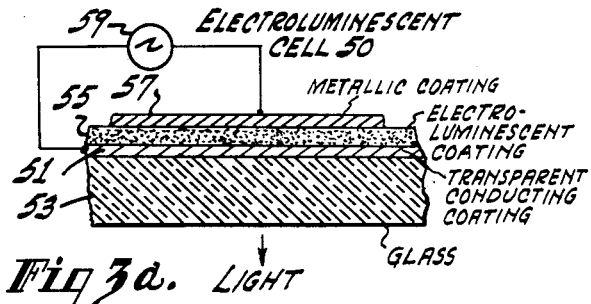
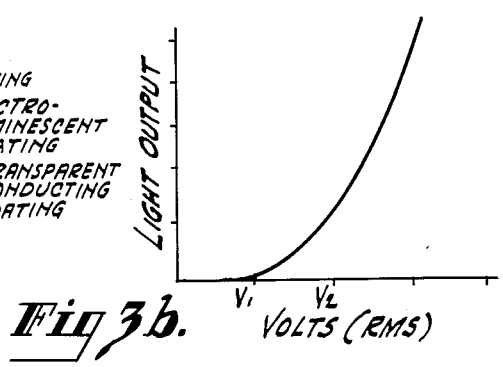
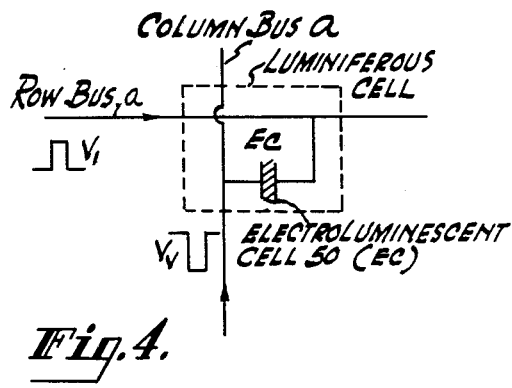
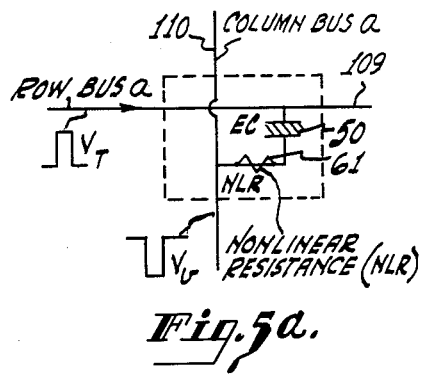
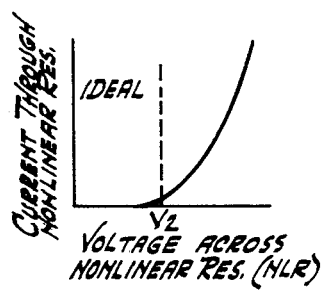
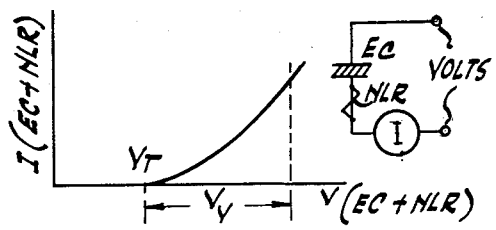

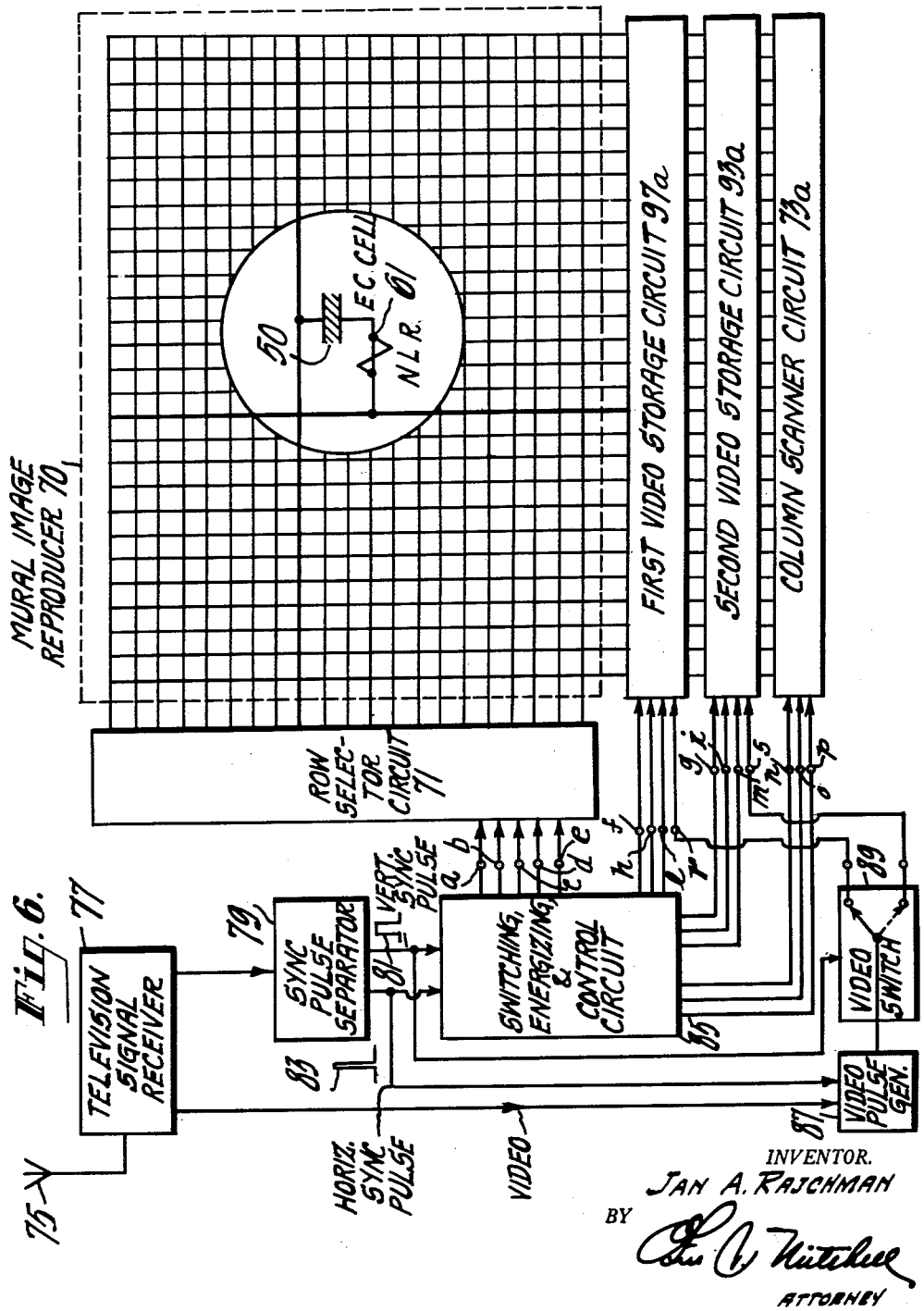

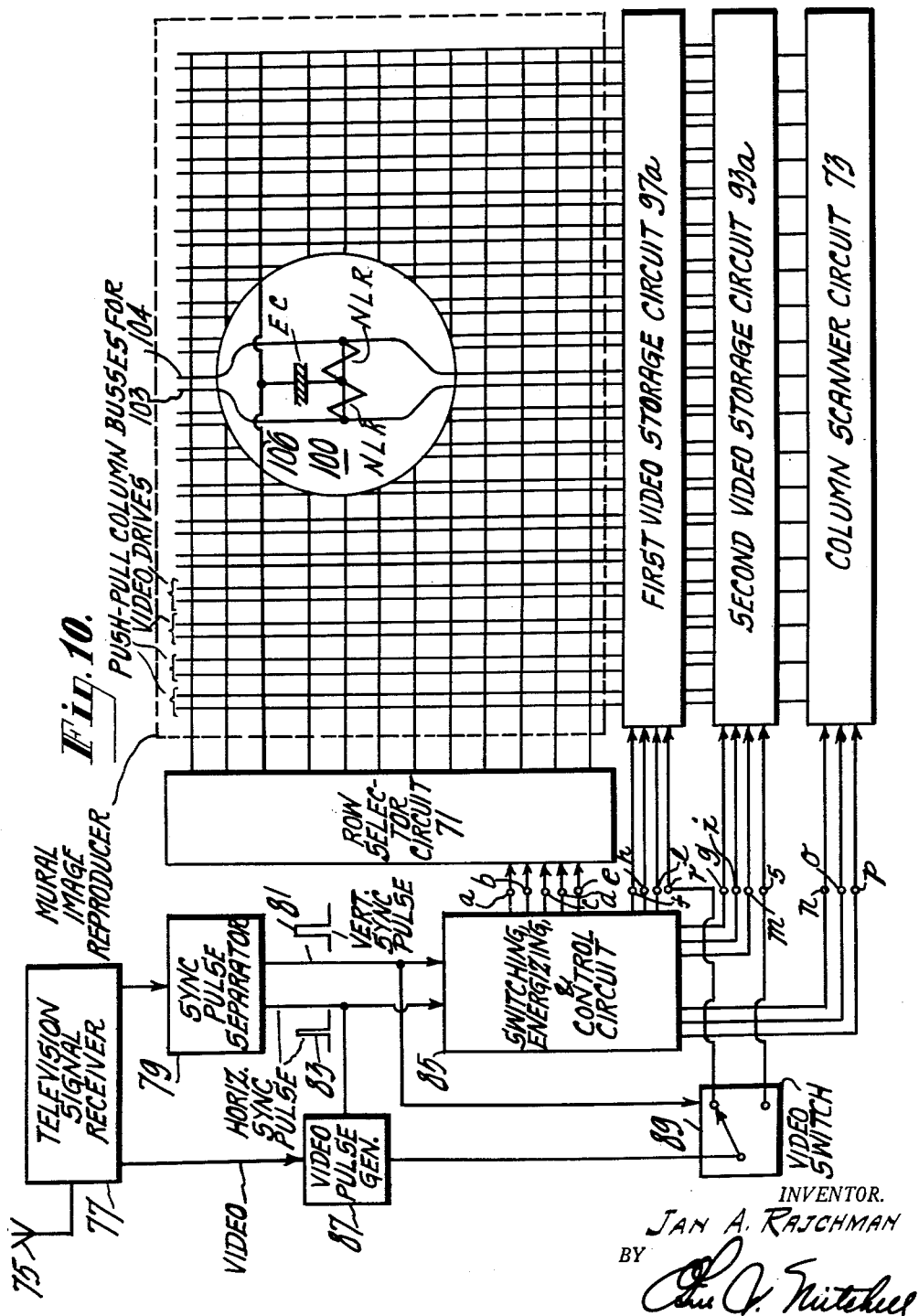

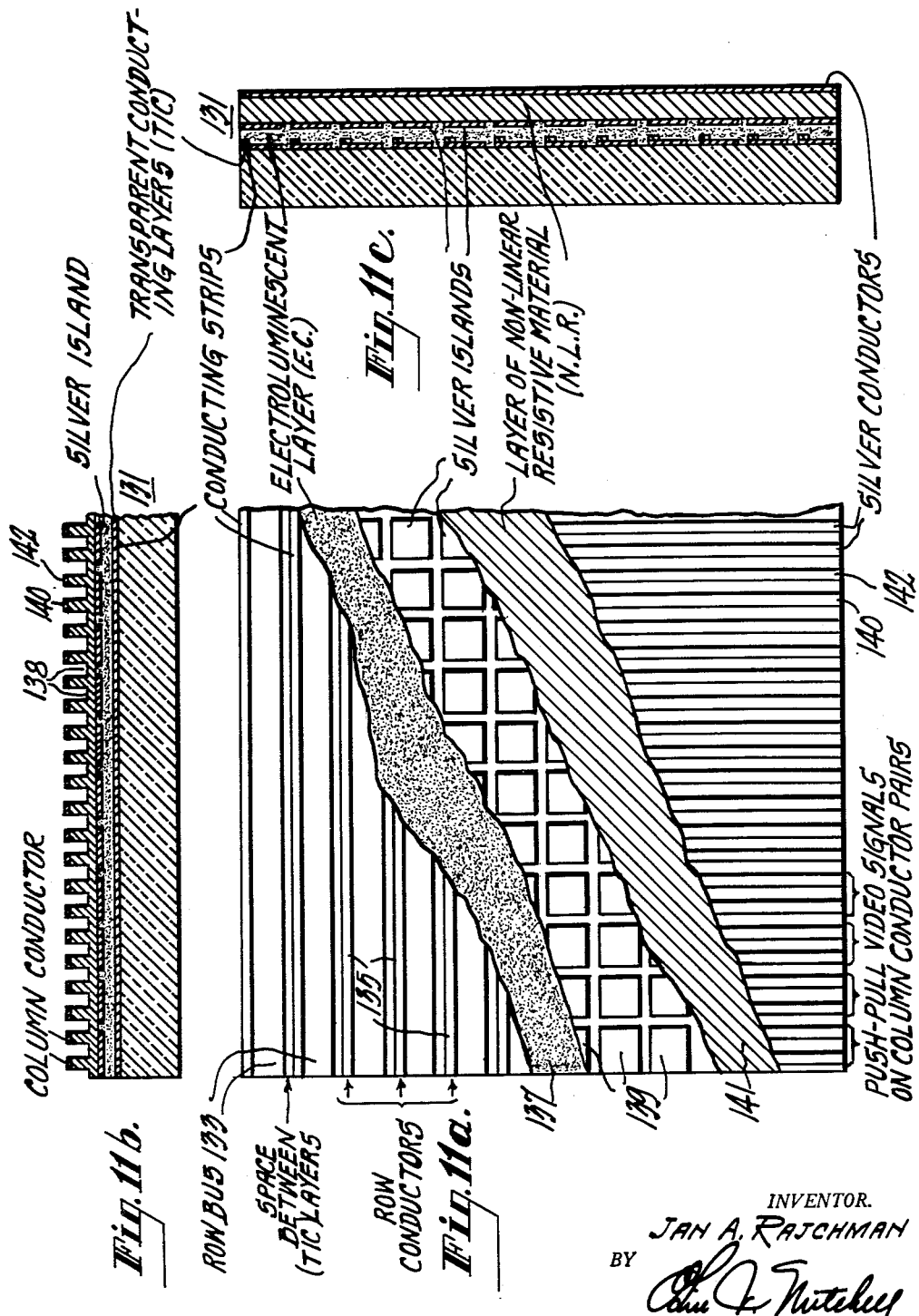

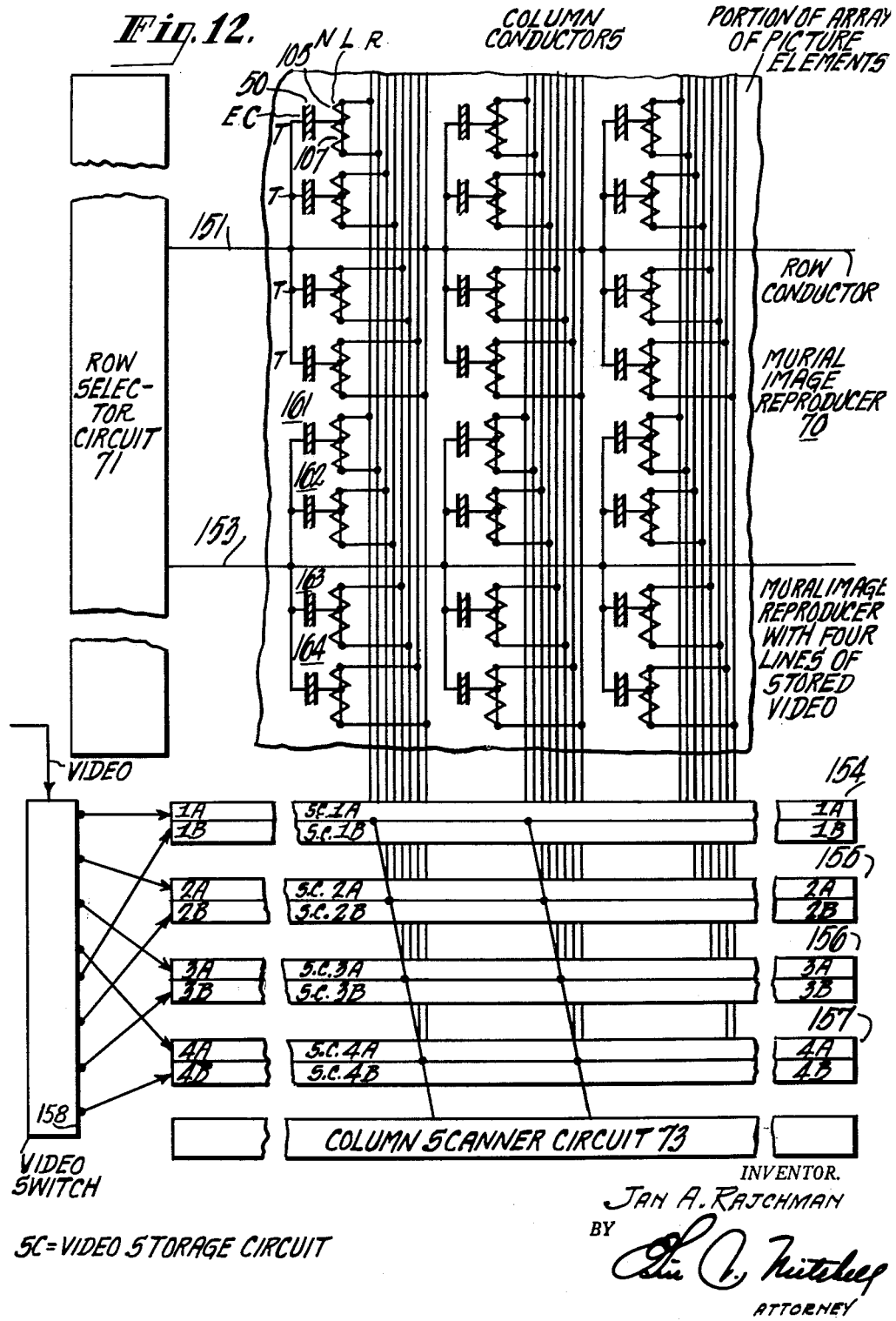

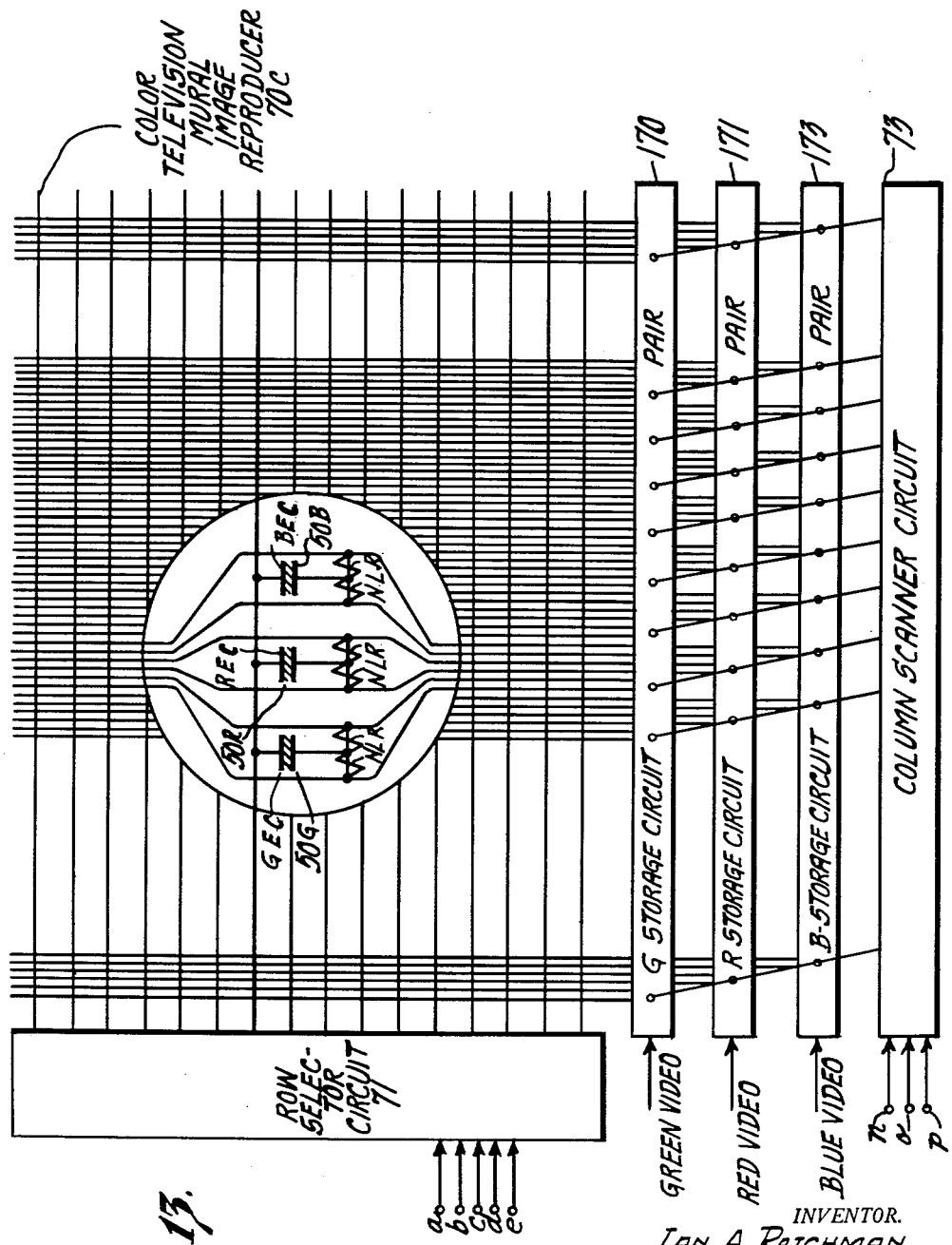

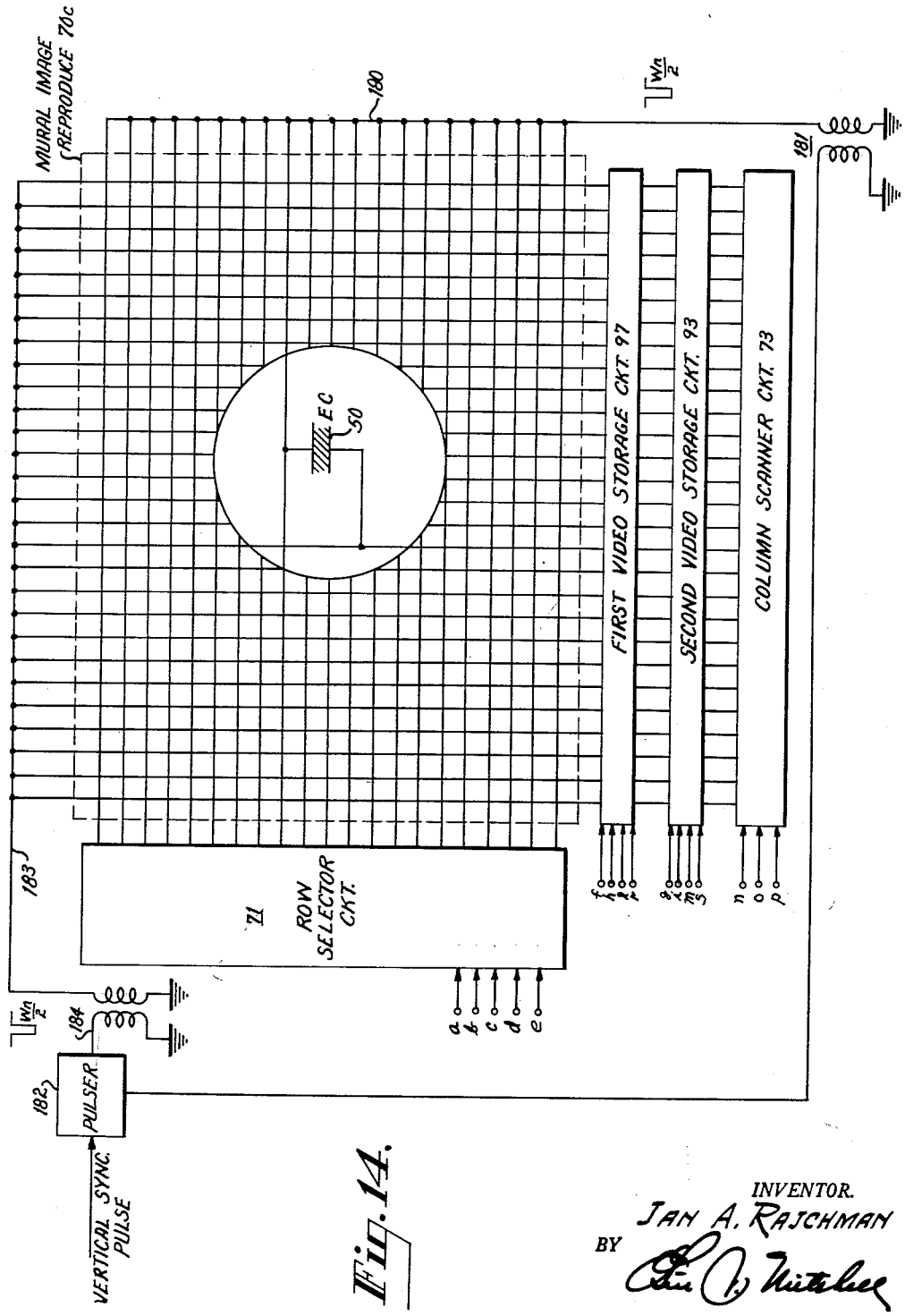

INVENTOR.
JAN A. RAJCHMAN
BY
ATTORNEY

Feb. 13, 1962  J. A. RAJCHMAN  3,021,387
ELECTRICAL DISPLAY DEVICE
Filed April 13, 1956  19 Sheets-Sheet 12

INVENTOR.
JAN A. RAJCHMAN
BY
ATTORNEY

Feb. 13, 1962     J. A. RAJCHMAN     3,021,387
ELECTRICAL DISPLAY DEVICE
Filed April 13, 1956     19 Sheets-Sheet 13
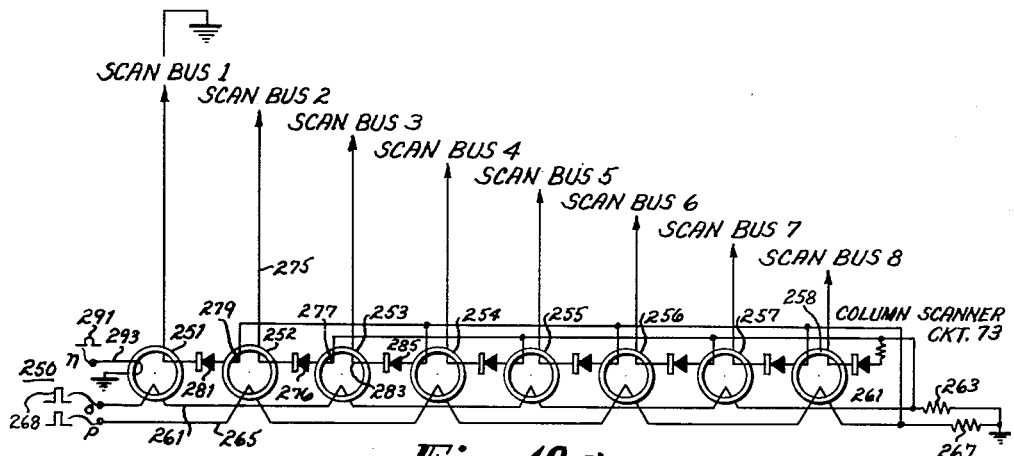
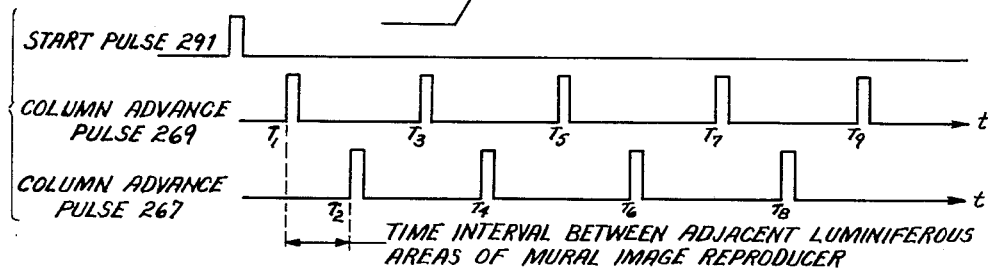
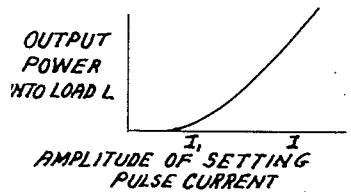
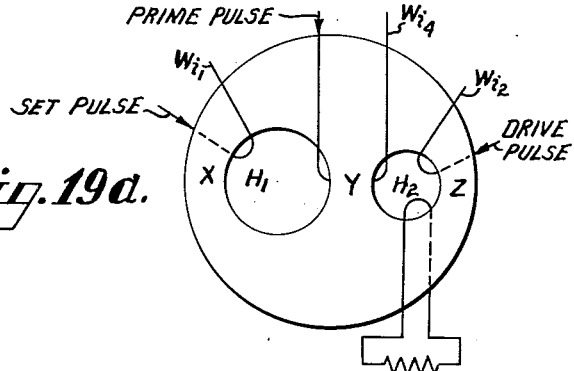
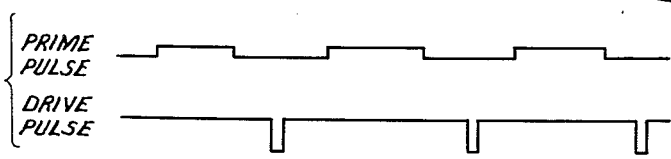
INVENTOR.
JAN A. RAJCHMAN
BY
ATTORNEY

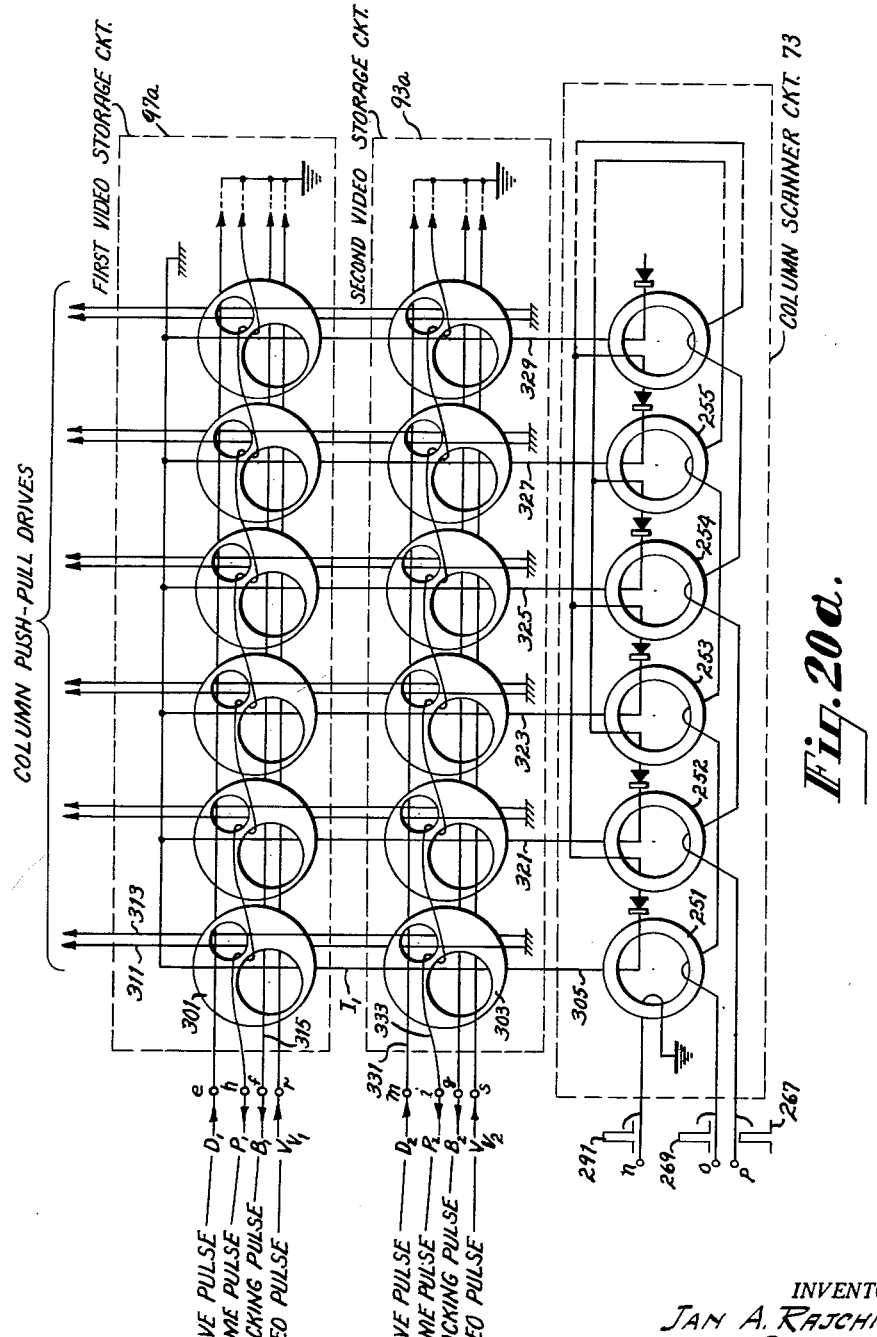

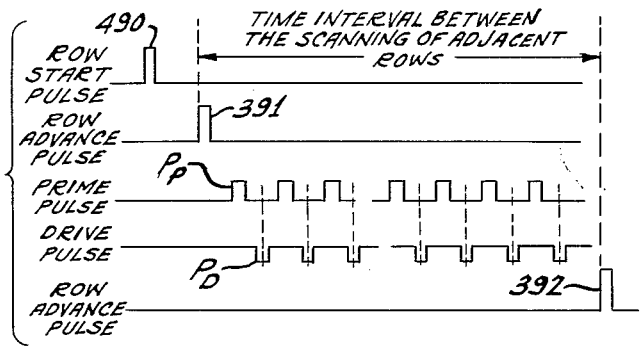
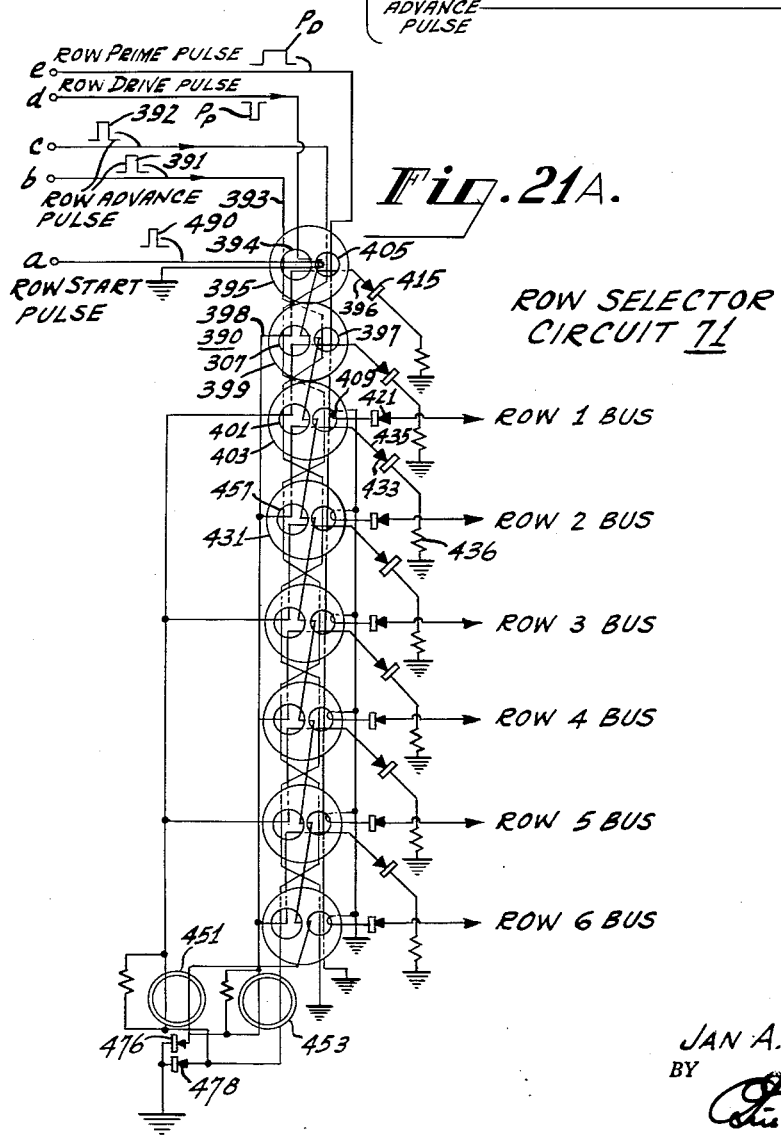

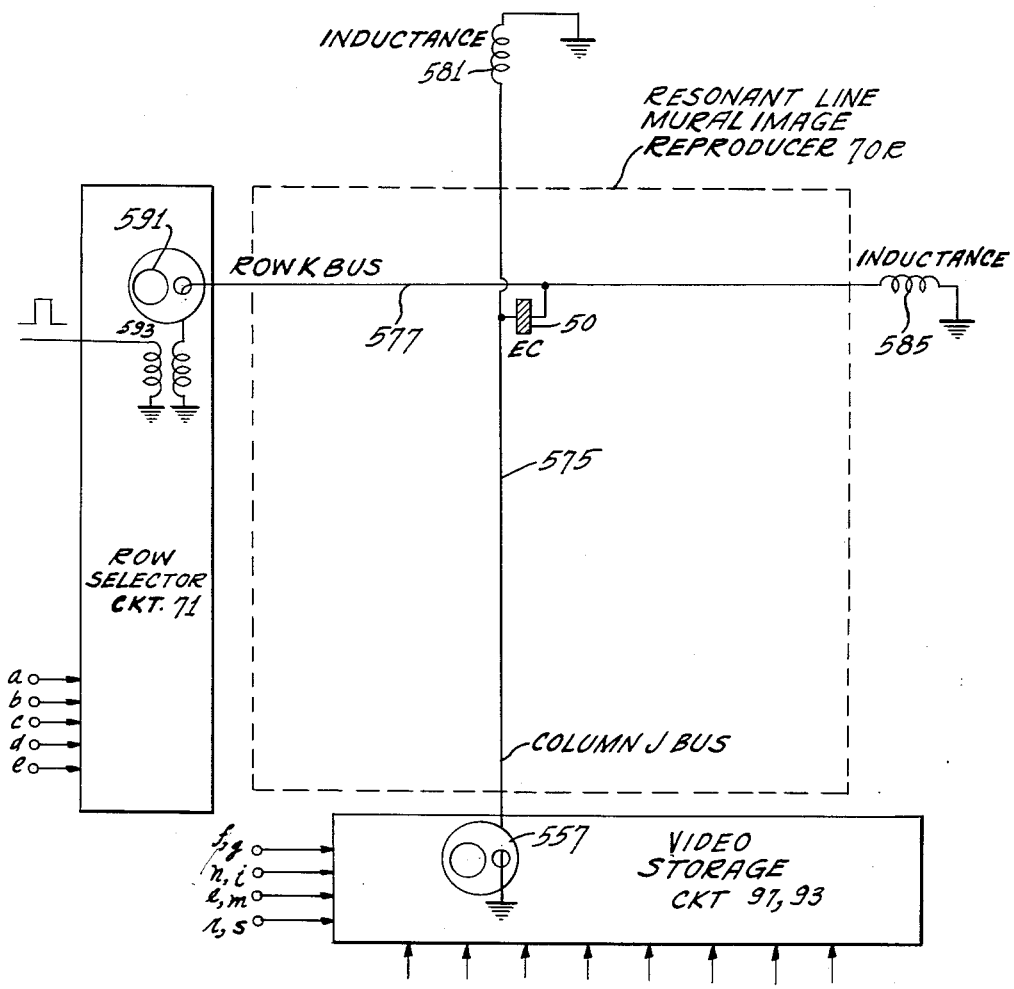
Fig. 23.
INVENTOR.
JAN A. RAJACHMAN
BY
ATTORNEY

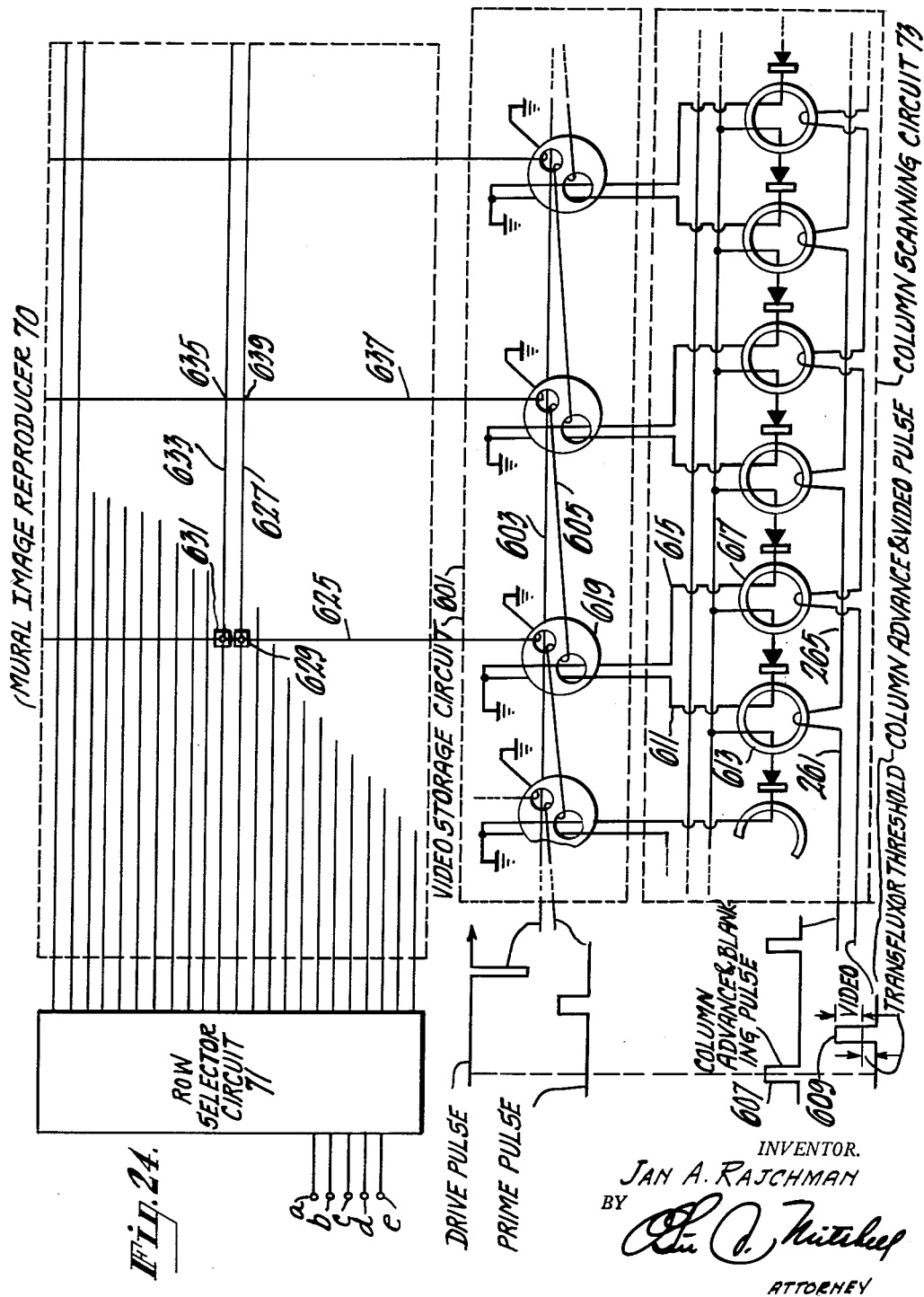

United States Patent Office 3,021,387
Patented Feb. 13, 1962

3,021,387
ELECTRICAL DISPLAY DEVICE
Jan Aleksander Rajchman, Princeton, N.J., assignor to Radio Corporation of America, a corporation of Delaware
Filed Apr. 13, 1956, Ser. No. 578,065
19 Claims. (Cl. 178—7.3)

The present invention relates to electrical display devices for displaying luminous or visual patterns in accordance with modulated electrical signals.

An electrical display device, according to the present invention, employs a novel matrix or array of elemental light emitting areas; such as electrical display device will be referred to hereinafter as a mural image reproducer.

A mural image reproducer has many uses in the communications art. One important use is in television signal receivers. A mural image reproducer also performs all functions presently performed by a cathode ray oscilloscope, and performs many of these functions better; for example, a mural image reproducer is capable of faithful linear reproduction without distortion due to nonlinear scanning.

The light output of each elemental light emitting area of a mural image reproducer will be controlled responsive to an electrical signal, such as a video signal, relating to that area. The actual average light output of each elemental area will be a function of the length of time the elemental area is caused to produce light; that is, if the area is caused to produce light output for intermittent periods of very short duration, the instantaneous light output during each period must be of very high intensity to produce the same average illuminations as an elemental area which produces substantially continuous light output.

A mural image reproducer in a television system wherein an image is scanned over 525 lines to completely explore the image and wherein an aspect ratio of 4:3 is used, may employ more than a half million elemental areas. If each elemental area were to produce light only during the very short interval of time (a fraction of a microsecond) that a video signal conveys image information relating to that area, the average light output from the mural image reproducer would be of the order of one divided by a half-million of the maximum instantaneous light output available from all elemental areas; the resulting picture would therefore be very dim. If, on the other hand, a storage element were associated with each elemental area to store the image information representative of that area, and to cause continuous light output from that area in accordance with the stored information, the instantaneous light output required of each elemental area would therefore be comparatively small and the reproduced image would be very bright. A device capable of uniquely performing this storage function is a transfluxor, a magnetic device described by Rajchman and Lo in their article, "The Transfluxor—A Magnetic Gate With Stored Variable Setting," published in the RCA Review for June 1955. The use of a transfluxor in combination with picture elements of a mural image reproducer has been described by the present inventor in his copending application entitled "An Electrical Display Device," filed May 31, 1955, and assigned the United States Serial No. 511,848, now Patent 2,928,894, granted Mar. 15, 1960.

Mural image reproducers having no storage of elemental information at each elemental area would therefore produce images of insufficient brightness; mural image reproducers having storage elements at each elemental area are very complicated and very expensive to construct.

The present invention provides for improved operation and simplified construction of a mural image reproducer having elemental picture areas arrayed in rows and columns, by storing video signal or image information corresponding to each elemental area for a time interval greater than the time interval corresponding to each elemental area during the scanning of a row including that area, but less than the time allotted to a field; this time interval is commensurate with the instantaneous and average light output obtainable from the elemental areas to provide a reproduced image with useable illumination. The storage means is shared between a plurality of elemental areas to provide a reduction in complexity and the number of circuit elements comprising the mural image reproducer and its associated circuits.

It is therefore an object of the invention to provide a mural image reproducer of simplified construction.

It is a further object of the invention to provide an improved image reproducer circuit utilizing a reduced number of switching and storage devices.

It is a still further object of this invention to provide an improved transfluxor-controlled mural image reproducer.

It is another object of the invention to provide an improved mural reproducer capable of high resolution and bright illumination.

It is still another object of the invention to provide a mural image reproducer requiring a relatively small number of storage devices (for storing elemental image information) as compared to the number of elemental light producing areas, to provide a reproduced image of bright illumination and luminosity.

According to the invention, a number of storage elements, smaller in number than the number of picture elements of an associated mural picture reproducer, is used to share image information between several selected elements. As a result, the picture information corresponding to each picture element is caused to produce corresponding luminosity from that element for an interval of time substantially greater than the time interval associated with that picture element in the received video signal and substantially less in duration than the time interval corresponding to each field of a transmitted image.

The mural image reproducer may be operatively connected to cause each picture element of a selected row to be luminous with required image information until the scanning of the next row whereupon the picture element on the same column but on the next row is energized and the first named picture element is deenergized. Each picture element of the mural image reproducer is therefore caused to be energized for a time interval corresponding to the time interval required to scan a complete row of picture elements.

According to another form of the present invention, image information relating to each elemental light producing area or luminiferous area along a scanned row of such areas, is first stored without causing light output until the information relating to a prescribed number of areas has been stored. This stored image information is then used to simultaneously cause light output from those elemental areas according to the stored image information corresponding to each elemental area.

In one circuit for practicing the present invention, a mural image reproducer has elemental light producing areas arranged in rows and columns; a first storage circuit including a plurality of storage elements stores the video or image information corresponding to all points along an entire first row scanning line of elemental areas. At the conclusion of the scanning of that first row, all elemental light-producing areas in that first row are caused to simultaneously produce light in accordance with the video information stored in the first storage circuit.

During the scanning of the second row, a second storage circuit stores the elemental-area image information corresponding to each point or column along the second row; during the scanning of the second row, the light output of elemental light producing areas is sustained according to the image information stored in the first storage circuit. During the scanning of the third row, the light output from the first row is cut off; the elemental areas of the second row are caused to produce light according to image information stored in the second storage circuit, and the elemental-area image information corresponding to each point or column of the third row is stored in the first storage circuit. During the scanning of the fourth row, the light output from the second row is cut off, the elemental areas of the third row are caused to produce light according to image information stored in the first storage circuit, and the elemental-area image information corresponding to each point or column of the fourth row is stored in the second storage circuit. This sequence of operations is repeated until each row has been caused to produce light according to the image information corresponding to each point or column along that row.

It therefore follows that each row is caused to produce light during at least the entire period of the scanning of one row. By increasing the number of storage circuits (above two), a corresponding plurality of rows may be caused to produce light simultaneously during each entire scanning period.

The present invention may be practiced by using an electroluminescent cell at each elemental area of the image reproduced. In such an arrangement, each electroluminescent cell is either coupled in combination with a nonlinear impedance, such as a nonlinear resistance or a nonlinear capacitance, or operated over a suitable voltage range; such a voltage range will have a lower voltage range of applied voltage where little or no light is emitted by the electroluminescent cell, and a higher voltage range above a threshold voltage wherein an increase in the magnitude of applied voltage produces a related increase in light output.

In one form of circuit for controlling a mural image reproducer of the present invention, wherein each elemental area is a luminiferous device having the above-mentioned threshold voltage, means are provided to apply a voltage representing a threshold voltage to the proper row at the correct time. A storage circuit, using, for example, transfluxors, is employed to apply voltages corresponding to voltages above threshold voltage and representative of the image information relating to each column or point along that row, to the corresponding picture elements of that row.

Other and incidental objects of the invention will become apparent upon a study and a reading of the specifications and the figures where:

FIGURE 1a is a block diagram of a scanning and storage circuit of the present invention;

FIGURE 1b is a diagram of waveforms relating to the circuit of FIGURE 1a;

FIGURE 2 is a block diagram of a mural image reproducer circuit of the present invention;

FIGURE 3a is a diagram describing the construction of one form of electroluminescent cell;

FIGURE 3b is a light output-versus applied voltage characteristic curve of the cell of FIGURE 3a;

FIGURE 4 is a circuit diagram of a picture element or luminiferous cell comprising an electroluminescent cell;

FIGURE 5a is a circuit diagram of a picture element including an electroluminescent cell and a non-linear resistance;

FIGURES 5b and 5c are characteristic curves of the elements of the picture element of FIGURE 5a;

FIGURE 6 is a block diagram of a television receiver including a mural image reproducer and a control apparatus of the present invention;

FIGURE 7 is a circuit diagram of a picture element of a mural image reproducer, comprising an electroluminescent cell in combination with a pair of nonlinear resistances;

FIGURE 8a is a circuit relating to the picture element of FIGURE 7;

FIGURE 8b is a characteristic curve relating to the operation of the picture element of FIGURE 7 according to the circuit arrangement of FIGURE 8a;

FIGURE 9a is another circuit relating to the picture element of FIGURE 7;

FIGURE 9b is a family of curves relating to the operation of the picture element of FIGURE 7 in accordance with the circuit arrangement of FIGURE 9a;

FIGURE 10 is a block diagram of a television receiver using a mural image reproducer wherein each picture element is of the type shown in FIGURE 7;

FIGURE 11a is a plan view partly broken away showing one fabrication of the mural reproducer of FIGURE 10;

FIGURE 11b is a horizontal sectional view of the structure of FIGURE 11a;

FIGURE 11c is a vertical sectional view of the structure of FIGURE 11a;

FIGURE 12 is a diagram of a mural image reproducer circuit with four rows of stored video;

FIGURE 13 is a mural image reproducer of the present invention adapted for use as a color television image reproducer;

FIGURE 14 is a diagram of a mural image reproducer circuit of the present invention wherein each picture element consists of only an electroluminescent cell;

FIGURE 15b is an equivalent circuit of the structure of FIGURE 15a;

FIGURE 16a is a curve relating to the operation of the non-linear capacitance element of FIGURE 15a;

FIGURE 16b is a hysteresis curve relating to the operation of a nin-linear capacitance element of FIGURE 15a;

FIGURE 18a is a schematic diagram of one form of column scanner circuit;

FIGURE 18b shows the time relationship between a pair of pulse trains required to actuate the circuit of FIGURE 18a;

FIGURE 19a is a diagram of a transfluxor;

FIGURE 19b is a diagram of a train of drive and prime pulses for actuating the transfluxor;

FIGURE 19c is a characteristic curve of the transluxor of FIGURE 19a;

FIGURE 20a is a schematic diagram of a pair of transfluxor-type video storage circuits;

FIGURE 20b is a diagram of a typical pulse sequence relating to the circuit of FIGURE 20a;

FIGURE 21a is a schematic diagram of a transfluxor-type of row selector circuit;

FIGURE 21b is a diagram of waveforms illustrating the time relationship between typical trains of pulses used to control the row selector circuit of FIGURE 21a;

FIGURE 23 is a diagram of a resonant-line type of mural image reproducer; and

FIGURE 24 is a diagram of a mural image reproducer using a single video storage circuit.

Figure 15A:
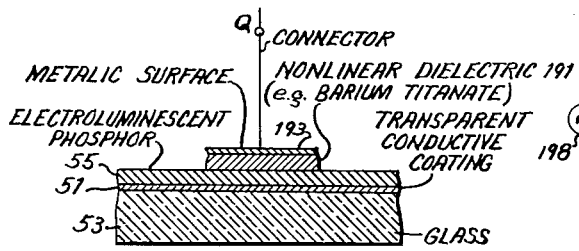
FIGURE 15a is a sectional view of a structure forming an electroluminescent cell in series with a non-linear dielectric element.

In one form of the present invention, controllable luminiferous cells are arranged in rows and columns. It is to be understood that controllable luminiferous cells are cells which are either actively transmitting, producing, or yielding light or are capable of transmitting, producing or yielding light, and are cells whose light output is controllable. The general classification of luminiferous cells includes light cells, electroluminescent cells, light valves, or devices of controllable optical transmission. Switching, storage and control devices are provided, each responsive to information relating to scanning information (synchronizing pulses) and to image or pattern information (video signals), for controlling the light output of each of the controllable luminiferous cells to cause the aggregate of luminiferous cells to reproduce the image or pattern corresponding to that information. According to the present invention, each luminiferous cell is caused to remain luminous for a time interval greater than the time interval of image information in a received video signal corresponding to that cell and for a time interval considerably less than the time interval of a frame or field of a transmitted image.

*Scanning and energizing a row of luminiferous cells*

FIGURE 1a is a block diagram of a row of controllable luminiferous cells activated by control circuits of the present invention. FIGURE 1b shows waveforms relating to the operation of the circuit of FIGURE 1a; these waveforms include video pulses 10, each of which represent image information corresponding to one of the cells.

Controllable luminiferous cells, denoted as cells 1, 2, 3, 4, and 5 are coupled to a scanning apparatus 11 by way of the storage circuit 13. In the form of the invention shown in FIGURE 1a, video pulses 10, consisting of a train of pulses each having an amplitude corresponding to the picture or image information intended for one of the cells, is applied to the scanning circuit 11. At the same time, a set of scanning pulses 15, consisting of a train of timing pulses in time coincidence with the video pulses, is also applied to the scanning circuit 11. The first scanning pulse causes the scanning circuit 11 to transmit the video pulse 1a intended for cell 1 to the storage circuit 13 by way of connector 16; the image information corresponding to video pulse 1a is stored in the storage circuit 13 without being instantly applied to cell 1. In like fashion, succeeding scanning pulses cause the video pulses 1b, 1c, 1d and 1e to be transmitted to and stored in the storage circuit, by way of the connectors 17, 18, 19 and 20, respectively. As in the case of video pulse 1a, image information relating to pulses 1b, 1c, 1d, and 1e is stored in the storage circuit 13 without being applied to the corresponding cells during the period wherein the scanning pulses are produced.

At the conclusion of the scanning of the row of cells, that is, after the last scanning pulse 21, a switching pulse 22 is applied to the storage circuit 13 which thereupon simultaneously causes the energizing of each of cells 1, 2, 3, 4 and 5 according to the stored information corresponding to each of the cells; thus the row of cells 1 through 5 will all become luminous at the same time and remain luminous until the storage circuit is de-energized. Upon the occurrence of pulse 23, the storage circuit 13 is caused to cease energizing cells 1 through 5; the stored image information derived from video pulses 1a, 1b, 1c 1d and 1e is thereupon removed from that storage circuit.

*A mural image reproducer with two video storage circuits*

The circuit of FIGURE 2 includes a multiplicity of rows and columns of controllable luminiferous cells thereby forming a portion of a mural image reproducer arrangement. Included in the circuit of FIGURE 2, are rows A, B, C and D, each including five controllable luminiferous cells; the cells are arranged in five columns with, for example, the first column of cells including the first cell in each of rows A, B, C and D.

Video pulses and scanning pulses are applied to the scanning circuit 11 of FIGURE 2 as in the circuit of FIGURE 1. The circuit of FIGURE 2 includes both a first storage circuit 13a and a second storage circuit 13b, a row selector circuit 24, and a switching circuit 25 which controls the first storage circuit 13a and the second storage circuit 13b and applies the video information to these circuits.

In the circuit of FIGURE 2, light output from each of the controllable luminiferous cells is controlled by not only video information stored by either the first storage circuit 13a or the second storage circuit 13b but by the row selector circuit 24.

The first storage circuit 13a and the second storage circuit 13b are each capable of either being responsive to video information and storing it or "reading out," that is, applying the stored video information to the columns of cells. The storage and "reading out" functions of both the first storage circuit 13a and the second storage circuit 13b are controlled by the switching circuit 25 which is responsive to switching pulses. It is to be understood that only the row of luminiferous cells which is selected by the row selector circuit 24 at the time of "reading out" or applying of video information to the various columns of luminiferous cells, will become luminous according to the applied video information.

Consider the case when successive trains of video and scanning pulses of the type described in connection with FIGURE 1 are applied to the scanning circuit 11 of FIGURE 2, and when switching pulses, timed to occur before and after each scanning of the columns of the circuit by the scanning circuit 11, are applied to the row selector circuit 24 and the switching circuit 25.

The row selector 24, the first storage circuit 13a and the second storage circuit 13b cause the circuit of FIGURE 2 to practice the present invention, responsive to the aforementioned train of suitably timed switching pulses, and also to the video and scanning pulses as indicated in the following chart:

| Switching Pulse | Row Selector Circuit | First Storage Circuit | Second Storage Circuit |
| --- | --- | --- | --- |
| First | | Stores Row A Video. | |
| Second | Selects Row A | Applies Row A Video to Row A. | Stores Row B Video. |
| Third | Selects Row B | Turns off Row A, Stores Row C Video. | Applies Row B Video to Row B. |
| Fourth | Selects Row C | Applies Row C Video to Row C. | Turns off Row B, Stores Row D Video. |
| Fifth | Selects Row D | Turns off Row C | Applies Row D Video to Row D. |

It follows from the preceding chart that the first storage circuit 13a and the second storage circuit 13b are shared between various rows of the cells; also, at any one selected time, once the first complete row of columns has been scanned, an entire row of controllable luminiferous cells produce light simultaneously. This mode of operation has a considerable advantage over the mode of operation wherein each luminiferous cell is caused to light up only for the period of time corresponding to the time interval that its corresponding image information occurs in an incoming signal, thereby necessitating execessively high voltages and peak light output from each luminiferous cell to produce a picture of useable luminosity. By causing each luminiferous cell to remain lit for at least the time interval of the scan of one row, a vastly reduced duty cycle regarding peak light output is required of luminiferous cell. It is evident to one skilled in the art that the circuit of the present invention also represents a considerable reduction in complexity and in the number of circuit components over a mural image reproducer circuit wherein storage of video information is provided at each picture element.

The circuit of FIGURE 2 has utilized a pair of storage circuits to yield the mode of operation where at least one row of luminiferous areas is always producing light. By increasing the number of storage circuits whereby each storage circuit is shared between a smaller number of rows, it is possible to further reduce the duty cycle required of each of the luminiferous cells by causing at least 2, 3, or 4, etc., rows of luminiferous cells to produce light simultaneously. The precise number of rows which will simultaneously produce light, will be determined by the number of storage circuits employed. Mural image reproducer circuits having a plurality of storage circuits greater than two will be discussed later in the specification.

The circuits of FIGURES 1 and 2 have utilized connections whereby video pulses are applied to the scanning circuit 11. It is to be appreciated that alternatively, the video pulses may be applied directly to the storage circuits wherein they will be stored and then applied to the luminiferous cells according to the present invention.

The applicant has thus described a general system by means of which a preferred embodiment of the present invention may be carried into practice. As to specific details of the various elements which have been schematically indicated in FIGURES 1 and 2, it is to be understood that there are many different systems and materials which may be utilized. However, in order to fully describe an operative system, several embodiments of circuits which are not well known to those skilled in the art and are employed for practicing the invention, will be described in the specification to follow.

It is to be appreciated that mural image reproducers having less than two video storage circuits and operatively connected according to the present invention, may also be devised. In one form of such a circuit, the stored video information relating to a luminiferous cell on a column of a mural image reproducer is stored for an interval of time corresponding to a rowscan interval until the luminiferous cell on that column but on the next selected row is energized with video information. Such a circuit uses a single video storage circuit; one embodiment of this circuit is described in connection with FIGURE 24.

*Electroluminescent cells*

The circuits for applying the stored image or pattern information in accordance with the present invention to the various luminiferous cells of a mural image reproducer will depend largely upon the electrical characteristics of the apparatus and devices which constitute each luminiferous cell.

One luminiferous cell which is useful in mural image reproducers of the present invention is an electroluminescent cell; this usefulness is due to the fact that the direct conversion of electrical energy into light within a solid provides a fundamentally attractive method for producing light over large areas. Producing light by the application of electrical potential to certain crystalline phosphors is called electroluminescence; using proper materials, electroluminescence provides a means for producing light in a very efficient manner.

A typical electroluminescent cell 50 is shown in FIGURE 3a. In the electroluminescent cell 50 of FIGURE 3a, a transparent conducting coating 51, having a thickness of approximately .001", is deposited on a sheet of glass 53. Electroluminescent coating 55, consisting typically of zinc sulphide or zinc sulphoselinide, (to name only two of the materials possible) is then coated on top of the transparent conducting coating 51. In the construction electroluminescent coating 55, microcrystalline grains of phosphor are mixed with a plastic liquid material. The electroluminescent coating 55 is then backed by a metallic coating 57. This metallic coating may be a layer of aluminum or silver or of any suitable conductive material. An alernating current or pulse generator 59 is thereupon coupled between the transparent conducting coating 51 and the metallic coating 57 to energize the electroluminescent cell.

A typical electroluminescent cell using zinc sulphide has a surface brightness of about 1 foot lambert when excited by 110 volts at 60 cycles. At a higher voltage and at 5 kc., a similar cell will provide a brightness of over 50 foot lamberts; a brightness of 50 foot lamberts when produced continuously is more than that required for television applications since 25 foot lamberts of brightness can easily be seen in a well lighted room. By further increasing the voltage across the electroluminescent coating 55, the surface brightness can be increased. A curve which is typical of light-output versus R.M.S.-volts across an electroluminescent cell, is shown in FIGURE 3b wherein it is seen that the light output increases rapidly as the voltage across the electroluminescent cell increases. The curve of FIGURE 3b is derived from an article by G. Destrian, pages 700, 774 and 880 of vol. 30 of Philosophical Magazine for 1946. It is noted from the curve of FIGURE 3 that an electroluminescent cell has a threshold voltage at approximately the point $V_1$; below $V_1$ the light output is either zero or of extremely low intensity.

FIGURE 4 shows one method of coupling an electroluminescent cell 50 for use in a mural image reproducer which utilizes row buses and column buses; the circuit of FIGURE 4 represents the luminiferous cell at a typical junction of row bus $a$ and column bus $a$. Let a pulse having an amplitude $V_1$ corresponding to the threshold voltage of the cure shown in FIGURE 3b be applied to row bus $a$; let a negatively polarized pulse having an amplitude $V_v$ denoting video information, be applied to column bus $a$. Since the electroluminescent cell 50 is connected between row bus $a$ and column bus $a$, the coincidence of the pulses applied to the two buses will produce a total voltage of $V_1+V_v$ across the electroluminescent cell 50 thereby producing a light output corresponding to $V_v$. It is to be appreciated that if the maximum value of $V_v$ is not as great as the threshold voltage $V_1$, then the impressing of a pulse $V_v$ across the electroluminescent cell 50 at a time when the pulse $V_v$ is not in time coincidence with the threshold voltage pulse having amplitude $V_1$, will not produce light from the electroluminescent cell 50.

If the threshold cutoff characteristics of the light-output versus voltage curves of the electroluminescent cell 50 are as sharply defined as those illustrated in FIGURE 3b, the producing of light from an electroluminescent cell 50 somewhere in a large array of electroluminescent cells can be made dependent upon the time coincidence of a pulse whose amplitude is representative of the image information at the point of location of the electroluminescent cell and a threshold voltage pulse. In a mural image reproducer circuit using two orthogonal sets of conductors (row buses and column buses), the threshold pulses are applied to selected conductors of one set and the image information pulses are applied to selected conductors of the other set. For such a mural image reproducer using video storage circuits according to the present invention, the image information pulses are supplied one set of conductors by the video storage circuits.

*Nonlinear resistances and electroluminescent cells*

In the case when the light-output versus applied-voltage across electroluminescent cell 50 does not have a sharply defined threshold voltage, a nonlinear resistance 61 may be coupled in series with the electroluminescent cell 50, as is shown in FIGURE 5a. Assume that the nonlinear resistance 61, given the abbreviation "NLR," has the characteristic curve shown in FIGURE 5b where it is seen that the current through the nonlinear resistance does not start to rise until the voltage across the nonlinear resistance approaches a threshold voltage $V_2$. Beyond the voltage $V_2$ across the nonlinear resistance, the current through the nonlinear resistance rises rapidly with an increase in voltage across that device.

Many physically realizable nonlinear resistances have reasonably sharp thresholds. For example, germanium or silicon diodes, properly biased, will provide ideal nonlinear characteristics. Other types of nonlinear resistances are, for example, the "varistor," used by Bell Telephone Laboratories, the ceramic nonlinear resistance named "thyrite" as manufactured by the General Electric Co. The name "polaristor" has also been proposed for another type of nonlinear resistance described by H. E. Hollman in the Proceedings of the Ire, pages 538–545, for May 1952. Cadmium sulfide, silicon carbide, and carbon powders are particularly suitable for making nonlinear resistances for use in a mural image reproducer of the present invention, because they can be made into a paste by being mixed with a plastic such as araldite. This paste can be conveniently spread over large areas. Only very moderate heating is required to solidify the paste into a material of fair mechanical strength. Such solidified materials have the additional advantage of being machinable.

A nonlinear resistance 61 coupled in series with an electroluminescent cell 50 provides a nonlinear characteristic curve representing the current through the electroluminescent cell plus nonlinear resistance as a function of the voltage developed across the electroluminescent cell plus nonlinear resistance; such a curve is shown in FIGURE 5c. It is seen in FIGURE 5c that below the threshold voltage $V_T$, no current passes through the electroluminescent cell 50 of the circuit of FIGURE 5a and therefore no light is produced. Above the threshold voltage $V_T$, the impressing of a further voltage $V_v$ representing the image information at the point where the electroluminescent cell is installed, will produce light at that point in accordance with the image information corresponding to that point.

*A mural image reproducer using a nonlinear resistance with each electroluminescent cell*

FIGURE 6 is a diagram of a mural image reproducer 70 used as a component of a television receiver; the mural image reproducer 70 employs a single nonlinear resistance in combination with each electroluminescent cell at each elemental area as described in connection with the circuit of FIGURE 5a. The mural image reproducer 70 includes row and column conductors each illustrated by a single line from the row selector circuit 71 and the column scanner circuit 73.

The row selector circuit 71 and the column scanner circuit 73 correspond to the row selector circuit 23 and the scanning circuit 11 of FIGURE 2. They are assigned different numerals, however, in virtue of the fact that will be described in detail later in the specification and include a multiplicity of input circuit connections which produce the various functions required of these circuits. Also, the use of numerals 71 and 73 for the row selector circuit and the column scanner circuit, respectively of FIG. 6, rather than the numerals 23 and 11 as used in the corresponding circuits of FIG. 2, serves to further associate the particular systems shown in FIGURE 6 with television applications.

At the contiguous intersection of each row and column conductor, an electroluminescent cell 50 in series with a nonlinear resistance 61 is installed with the series circuit electrically coupled between the pair of contiguous conductors.

In the circuit of FIGURE 6, the incoming television signal arrives at the antenna 75 and is applied to the television signal receiver 77. In the television signal receiver 77, the television signal information is demodulated; the demodulated television signal information includes a video signal and both vertical and horizontal synchronizing pulses. The television signal is applied to the sync pulse separator 79 which separates the vertical and horizontal synchronizing pulses 81 and 83, respectively, and applies these separaed pulses to the switching, energizing and control circuit 85. The video signal is applied to the video pulse generator 87 which, responsive to the horizontal synchronizing pulses 83, produces trains of video pulses representing respectively video information at substantially each point of the scanning lines of the television image. The precise number of video pulses produced during each scanning line are a function of the number of columns used in the mural image reproducer 70.

The video pulse generator 87 applies the trains of video pulses to the video switch 89 which, responsive to vertical synchronizing pulses 81, switches the video pulses to the first video storage circuit 97a during one scanning line and to the second video storage circuit 93a during the next scanning line. During the scanning line after the last named one, the video pulses are switched back to the first video storage 97a and so on. The first video storage circuit 97a and the second video storage circuit 93a correspond to the first storage circuit 13a and the second storage circuit 13b of FIGURE 2 respectively.

The switching, energizing and control circuit 85 controls the row selector circuit 71, the column scanner circuit 73, the first video storage circuit 97a and the second video storage circuit 93a. The column scanner circuit 73 successively applies signals to the first video storage circuit 97a and to the second video storage circuit 93a; the row selector circuit 71 selects and applies energizing signals to each of the row conductors of the mural image reproducer 70 in a prescribed sequence. In one mode of operation, the row selector circuit 71 will provide a voltage along a selected row equal to the threshold voltage $V_T$. Either the first video storage circuit 97a or the second video storage circuit 93a, depending on which is "reading out" video pulse information to the column conductors at the time of the energizing of the selected row, will provide a video pulse to each of the circuits; the "read out" video pulse information applied to each column conductor will have an amplitude indicative of the image information required at the corresponding point in the row being selected at that time.

The operation of the circuit of FIGURE 6 is described as follows: as the train of pulses corresponding to the first scanning line of a televised image is produced by the video pulse generator, this train of pulses is switched by the video switch 89 to the first video storage circuit 97a; responsive to scanning action by the column scanner circuit 73, each video pulse is stored by the first video storage circuit 97a at the column for which that video pulse is intended. None of the columns nor any of the rows are actually energized during this time; the only action which occurs is the aforementioned storage of the video information relating to the first scanning line in the first video storage circuit 97a. During the reception by the antenna 75 of video information corresponding to the second line of the televised image, the corresponding video pulses relating to the second line, as produced by the video pulse generator 87, are switched by the video switch 89 into the second video storage circuit 93a wherein image information corresponding to the entire second line is successively stored; however, during the storage of the information relating to the second line in the second video storage circuit 93a, the first video storage circuit 97a and the row selector circuit 71 in combination apply threshold and video information voltages respectively to each electroluminescent cell 50 and nonlinear resistance 61 along the first row of the mural image reproducer 70, to cause each electroluminescent cell 50 along the first row to become luminous according to the video information corresponding to the location of that cell in that row. Each electroluminescent cell of the first row produces light during the entire period wherein the second line of video information is being stored in the second video storage circuit 93a.

During the reception of the third line of video information, the first video storage circuit 97a ceases applying first-line video information to each of the column conductors, and proceeds to store each video pulse of the third line; the second video storage circuit 93a and the row selector circuit 71 apply video information voltages and threshold voltages, respectively, to each of the electroluminescent cells and nonlinear resistances throughout the second row, for a non-interlaced television signal, or throughout the third row for an interlaced television signal. The selected row of electroluminescent cells is therefore caused to produce light simultaneously according to video information derived from the second line of the received video signal.

This process is repeated from row to row with the first video storage circuit 97a and the second video storage circuit 93a alternately storing video information corresponding to an entire line or "reading out" the video information corresponding to an entire line to a selected row of the mural image reproducer 70. It is to be appreciated that in the circuit of FIGURE 6, luminosity corresponding to at least one scanning line of the video signal will always be present; it is to be further appreciated that the first video storage circuit 97a and the second video storage circuit 93a are shared between alternate rows of the mural image reproducer 70.

Circuits which may be used for providing the functions of the switching, energizing and control circuit 85, the first video storage circuit 97a, the second video storage circuit 93a and the column scanner circuit 73 will be described in detail later in the specification. A study of these later described circuits will account for a number of conductors which couple the various circuits as shown in FIGURE 6; the use of terminals designated $a$–$p$ in FIG. 6 facilitate the understanding of the precise method of connection of the component circuits of FIG. 6 in terms of, say, the circuits of FIGS. 18A, 20A, 21A, and 22 of the present specification. The description of these component circuits is purposely delayed to a latter portion of the specification so that the detailed description of the devices and of the operation of these circuits will not detract from an understanding of how the circuit of FIGURE 6 functions according to the present invention.

*Mural image reproducers using an electroluminescent cell and two nonlinear resistances at each element*

The mural image reproducer 70 of FIGURE 6 uses an electroluminescent cell 50 and a nonlinear resistance 61 at each picture element. The embodiment of the present invention, to be described as follows, employs an electroluminescent cell and a pair of nonlinear resistances at each picture element in an arrangement which provides for increased picture contrast by reducing the light output of electroluminescent cells in non-selected rows of picture elements.

One arrangement of components of a picture element, comprising an electrolumiscent cell and a pair of nonlinear resistances is shown in FIGURE 7. In the circuit of FIGURE 7, the video pulses are produced in push-pull on a pair of column buses 101 and 103; that is, the video pulses are developed in one polarity on column bus 103 and in opposite polarity on column bus 101. The column buses 101 and 103 may be considered as constituting a single column "conductor" of the mural image reproducer.

Non-linear resistances 105 and 107 are connected in series between the point M on column bus 103 and point P on column bus 101. The connecting point between the nonlinear resistances 105 and 107 is assigned the identifying letter S. An electroluminescent cell 50 is connected between point S and the row bus (conductor) 109. Threshold level pulses are provided on row bus 109.

Consider the case where the elements of FIGURE 7 are located on a non-selected row; that is, on a row which has not been selected by a row selector for causing light output to be produced from the elemtroluminescent cells on that row. If the nonlinear resistances 105 and 107 have identical current voltage characteristics, the voltage at the point S will remain zero for any amplitude of video pulses produced on the buses 103 and 101; this is due to the fact that the video pulses are in push-pull. On non-selected rows, the potential at the point T is zero since no threshold pulses are applied to the row buses of these rows. Therefore, the voltage across the electroluminescent cells, if connected between corresponding points S and T, is identically zero. Since there will be no voltage produced across each electroluminescent cell 50, the background light of a mural image reproducer from all non-selected rows will be equal to zero.

When the elements of FIGURE 7 are in a row which has been selected by a row selector circuit, threshold voltage pulses of amplitude $V_T$ are applied to the row bus 109. At the same time, push-pull video pulses are applied to the pair of column buses 101 and 103; the video pulses having an amplitude $+v$ are applied to column bus 101 and video pulses having amplitude $-v$ are applied to the column bus 103. It is assumed that the absolute value of $v$ is less than $V_T$. The voltage developed between points T and M, that is, across the electroluminescent cell 50 and the nonlinear resistance 105, is equal to $V_T$. The voltage developed from the point T to point M, that is, across the electroluminescent cell 50 and the nonlinear resistance 107, is equal to $V_T + v$; the voltage between points T and P is equal to $V_T - v$. If the nonlinear resistances 105 and 107 have thresholds of conductivity at $V_T$, no current will flow through the nonlinear resistance 105 and the voltage across the nonlinear resistance 107 will be equal to $V_T$ so that the video pulse voltage will appear entirely across the electroluminescent cell 50.

When using nonlinear resistances having no sharply defined threshold of conductivity, the distribution of currents among the elements of the circuit of FIGURE 7 becomes more complex. It is apparent that the voltage $V_T + v$ between the points T and M is greater than the voltage $V_T - v$ between the points T and P so that a large unbalance of current will flow through the elements of the circuit with most of the current flowing through the nonlinear resistance 105. Consequently, a large current will flow through the electroluminescent cell 50 and a voltage across that cell will be substantially equal to the video voltage.

FIGURES 8 and 9 are characteristic curves which describe the current flowing through both single and push-pull connected nonlinear resistances. FIGURE 8 is a schematic diagram of a nonlinear resistance 110 across which a voltmeter 111 has been connected. An ammeter 113 is connected in series with the circuit consisting of the nonlinear resistance 110 in parallel with the voltmeter 111, between end terminals 115 and 117. The current and voltage indicated by the ammeter 113 and the voltmeter 111 as a function of voltage applied between the end terminals 115 and 117, is shown in FIGURE 8b. It is seen in FIGURE 8b that the current through the nonlinear resistance 110 is substantially zero for voltages below the voltage $V_T$; for voltages greater than $V_T$, the current increases rapidly with an increase of voltage applied across the nonlinear resistance 110. If the applied voltage is changed in polarity then the characteristic curve of FIGURE 8b shows that for voltages between zero and $-V_T$, substantially no current flows through the nonlinear resistance 110. For voltages of negative polarity and of increasingly large amplitude (absolute value) beyond $-V_T$, the characteristic curve 119 dips sharply negative.

FIGURE 9a shows a combination of elements resembling the elements of the circuit of FIGURE 7. An ammeter 113 is connected in series with a resistance 121 having a resistance R. The ammeter 113 and the resistance 121 are connected between the aforementioned terminal T and the terminal S, the latter terminal representing the mid-terminal connection of the two nonlinear resistances 105 and 107 which are serially connected between terminal points M and P. A voltage V is applied to the terminal T. Push-pull voltages $-v$ and $+v$ are applied to terminals M and P as in the circuit of FIGURE 7.

FIGURE 9b is a family of curves which relate the current through the ammeter 113 as a function of the voltages V and $v$. The solid line curves are for current which will flow through the ammeter 113 when the resistance R is of very small magnitude. This current is the sum of the current flowing through the nonlinear resistances 105 and 107 and is plotted for various values of the push-pull voltage $v$ as a function of V. The individual currents passing through the two nonlinear resistances are plotted with dash lines. Three sets of curves are shown; i.e., for $v=0$, $v=\frac{1}{2}V$ and $v=V$. Curve 123 shows the current for the case where $v=0$. Curves 125 and 127 are for currents for the case of $v=V/2$ and $v=V$, respectively.

A load line 129 is included in FIGURE 9b. The load line 129 has a slope corresponding to the resistance R of the load, and intersects the voltage axis at V volts. The load line intersects each of the solid line curves; these intersections show the range of variation of the current as the video signal varies in magnitude from $v=0$ to $v=V$. It is to be understood that although an electroluminescent cell 50 is principally capacitive, the use of the resistance 121 rather than a capacitance in the circuit results in characteristic curves which are an excellent approximation to similar curves which would result from the case where the resistance 121 is replaced by an impedance which is principally capacitive.

The curves of FIGURE 9B show that for relatively large values of applied voltage $v$ (video information), substantially all of the current is carried by one of the nonlinear resistances, and the current through the other can be neglected. (In this region of consideration, the solid line curves practically coincide with the dash line curves.) For small values of applied voltage $v$, both nonlinear resistances carry current with the distribution of current between the nonlinear resistances becoming more balanced as the voltage decreases in magnitude. It is noted from the intersection of the load line and the various curves of FIG. 9B that when $v=0$, a current $I_N$ is present. This is a "noise current" which can be shown to be twice as large as the noise current for the case when a single nonlinear resistance is used; as the nonlinear impedance is caused to have a more sharply defined threshold, the magnitude of $I_N$ is reduced.

FIGURE 10 is a diagram of a television receiver using an electroluminescent cell 50 and a pair of nonlinear resistances 105 and 107 are used at each picture element of the mural image reproducer 70. The operation of the components at each picture element has been described in connection with the circuit of FIGURE 7. The overall circuit of FIGURE 10 is substantially identical to that of FIGURE 6 with the exception of the fact that the first video storage circuit 97a and the second video storage circuit 93a provide push-pull video pulses to each of the picture elements. The first video storage circuit 97 and the second video storage circuit 93 of the circuit of FIGURE 6, each, during selected time intervals provide video pulses of a single polarity to each of the picture elements; hence the letter "a" is used in connection with each of the first and second video storage circuits of FIGURE 10 so that these circuits may be properly distinguished over the corresponding circuits of FIGURE 6. The producing of push-pull voltages rather than voltages of a single polarity by the video storage circuits will be seen to be readily accomplished by circuits to be described (see FIGURE 20a). In the mural image reproducer 70 of FIGURE 10, the picture element 100 is energized by push-pull video pulses provided on column buses 102 and 104 and threshold level pulses provided on the row bus 106.

The use of push-pull video drive of picture elements, as shown in the circuit of FIGURE 10, effectively causes a reduction of current through electroluminescent cells in nonselected picture elements and thereby produces improved contrast in the image reproduced by the mural image reproducer. This contrast is obtained at an expense of the doubling of the number of nonlinear resistances used and the need for somewhat greater driving power. This expense is not unreasonable in practice in virtue of the fact that mass production techniques required to fabricate one form of mural image reproducers are practically the same regardless of whether a single or a double nonlinear resistance has to be fabricated for every picture element; typical fabrication techniques for constructing a mural image reproducer of the type shown in FIGURE 10 will be described in the next section. Also, the power lost in the nonlinear resistances located in rows other than the selected row is very small, since the voltages developed across the nonlinear resistances are in the range of low conductivity of each nonlinear resistance. The more nonlinear the characteristic curve of each nonlinear resistance, that is, the more sharply defined a threshold of conductivity of the resistances, the less power is wasted in the non-selected rows. A considerable advantage is therefore realized in using a pair of nonlinear resistances having characteristic curves as nonlinear as possible. However, it is an important virtue of the system that the only disadvantage of poor nonlinearity is a waste of power, but not a loss of contrast.

The merits of the mural image reproducer 70 of FIGURE 10, using push-pull drive of picture elements, each of which includes two nonlinear resistances, are summarized as follows:

(1) The luminosity of a reproduced image is of usable proportions, because of the storage and luminance display of video information, one row at a time.

(2) The contrast of a reproduced image is improved because the nonselected rows produce no background light.

(3) The power wasted in driving each picture element is small.

*The construction of a mural image reproducer*

The mural image reproducer 70 of FIGURE 10 can be constructed using suitable materials and techniques as illustroted in FIGURE 11. According to the sectional views shown in FIGURES 9a, 9b and 9c, a glass plate 131 is coated with a transparent conductive coating (TIC). The transparent conductive coating is thereupon cut so that strips of transparent conductive coatings remain on the glass plate to form a series of row buses 133. For the purpose of reducing the resistance of the various row buses 133, reinforcing strips of metal are applied to one edge (or in the middle) of each of the strips of transparent conductive coatings. These reinforcing strips of metal are thereupon employed as row conductors and are assigned the numeral 135. The row conductors 135 may be silver strips deposited by evaporation or silk screening.

The glass plate 131 with its row buses 133 and row conductors 135 is thereupon uniformly coated with an electroluminescent layer 137. This electroluminescent layer may be, typically, a powder of zinc sulfide, appropriately activated and mixed with a plastic such as araldite. The coating of the electroluminescent layer 137 is typically .001 to .002 inch thick.

On the surface of the electroluminescent layer 137, an array of metallic islands 139 are deposited, one for each picture element. These metallic islands are deposited, for example, by silk screening a pattern of squares of silver onto the electroluminescent layer 137. These silver squares 139 correspond, electrically, to the point S in the diagram of the elements of the picture element as is shown in FIGURE 7. The transparent conductive coating strips, that is, the row buses 133 and the row conductors 135, correspond to the point T of the diagram of FIGURE 7.

The array of silver islands 139 is coated with a layer of nonlinear resistive material 141. This layer may consist, for example, of cadmium sulfide powder mixed with araldite plastic or carbon silicate powders mixed with araldite plastic. This layer of nonlinear resistive material 141, may be typically from .020 to .100 inch thick. After the nonlinear resistive material 141 has been coated on the array of silver islands 139, the coating of nonlinear resistive layer 141 is hardened by low temperature baking. After the baking is completed, the nonlinear resistive layer 141 is coated with a uniform metallic film such as silver. The nonlinear resistive layer 141 with its metallic backing is now machined with column grooves 138 as shown in FIGURE 11b, so that two ridges of metal-backed nonlinear resistive layer are coupled to each column of silver islands 139. The strips of metallic film 140, 142 on top of each of the ridges, form the terminals M and P of FIGURE 7.

The method of construction of the mural image reproducer, as described above, does not require individual operations per picture element but rather constructional operations along rows and columns. The row construction operations are performed on the entire array at the same time; the column construction operations are performed for either a column at a time or for groups of columns at a time. The aforementioned construction is practical for an array having typically 525 rows and 700 columns which could be used for a mural image reproducer which is intended to reproduce a 525 line standard television picture with maximum resolution.

The construction features and techniques described in connection with FIGURE 11 have been presented for demonstrating one type of fabrication; alternative constructional techniques are possible. For example, glass or plastic strips coated with silver can be used instead of a single glass sheet. These strips can be coated with silver islands and provided with properly machined nonlinear resistive coatings, a group of strips may then be assembled to form the entire array constituting a mural image reproducer.

*Mural image reproducer with four lines of stored video*

The circuit of FIGURE 12 includes a mural image reproducer circuit wherein four lines of stored video information are displayed and reproduced at one time. Four lines in, say, 525 lines, reduces the duty factor required of the electroluminescent cells 50 by a factor of 4 over a circuit which stores and reproduces one line at a time in 525 lines and represents a virtual reduction in duty factor of approximately 3,000 over a mural image reproducer system wherein each picture element is caused to produce light output only during the time that the image information, relating to each picture element, is received by the receiver circuits associated with the mural image reproducer.

The mural image reproducer 70 of FIGURE 12 employs a plurality of row conductors which are actuated by a row selector circuit 71. The diagram of FIGURE 12 shows two row conductors (row buses) 151 and 153.

Four pairs of video storage circuits are used in connection with the mural image reproducer 70 of FIGURE 12; these pairs of video storage circuits are assigned the numerals 154, 155, 156 and 157. Each of the pairs of video storage circuits 154 through 157 has a first and second component video storage circuit which corresponds respectively to the first and second video storage circuits 97 and 93 of FIGURE 6. For the purpose of simplifying the discussion, the first of each of the pairs of storage circuits 154, 155, 156, and 157 is called the A circuit; the second of each of these pairs is designated the B circuit.

The mural image reproducer 70 of FIGURE 12 employs picture elements wherein an electroluminescent cell 50 and a pair of nonlinear resistances 105 and 107 are employed in each picture element. The video storage circuits 154 through 157 apply push-pull video pulses to each of the picture elements in proper timing. In the circuit of FIGURE 12, four picture elements, each including an electroluminescent cell 50 and nonlinear resistances 105 and 107, are coupled respectively to each of the video storage circuits 154, 155, 156 and 157. The corresponding point T of each of the four picture elements is connected to one of the row buses. Each of the T connections (see FIGURE 7) of the picture elements 161, 162, 163, and 164 are connected to the row bus 153. In this way, by using a common row conductor, a plurality of four rows of picture information can be displayed at one time responsive to selection of a group of four rows by the row selector 71, and using picture element information stored in either of the pairs of the video storage circuits 154 through 157.

The video storage circuits 154, 155, 156, and 157 are actuated by the column scanner circuit 73 and are applied with video pulses by way of the video switch 158, which responsive to video information and to appropriately timed switching signals, applies the video pulses to each video storage circuit in proper sequence.

While the A video storage circuits of the video storage circuits 154, 155, 156, and 157 are scanned and actuated to accept and store video information from the video switch 158, the B video storage circuits are energized to produce luminous display from four rows of picture elements. The roles of the A and B video storage circuits are changed every four lines. In one sequence of operation of the circuit of FIGURE 12, the video storage circuits may be stored with video according to the order 154A, 155A, 156A, 157A; after this storage is completed, the row selector circuit applies a suitable threshold pulse to the row bus 151. Each of the rows of picture elements coupled to row bus 151 are thereupon caused to become luminous according to the video information stored in video storage circuits 154A–157A. While the picture elements of the rows coupled to row bus 151 continue to provide sustained luminosity, video information relating to each of the picture elements included in the rows coupled to the row bus 153 is stored in the video storage circuits 154B, 155B, 156B, and 157B. When the storage of the video information in the video storage circuits 154B–157B is completed, the four rows of picture elements coupled to row bus 153 are caused to display luminous information according to the video information stored in the video storage circuits 154B–157B; the picture elements in the four rows of picture elements coupled to row bus 151 are deenergized, and the video storage circuits 154A–157A are caused to store the next four rows of video information.

The principles of the present invention described in connection with the circuit of FIGURE 12 are intended to illustrate how more than one line of stored video information may be utilized to advantage with a mural image reproducer system. It is to be understood that the use of four lines of stored video does not necessarily represent a definitive type of operation. A mural image reproducer using from 10 to 20 or more lines of video storage or less than four lines of video storage may be used to advantage; however, the greater the number of stored video lines, the brighter the picture, also the more complex the system.

*A color television mural image reproducer*

The present invention using the sharing of storage circuits between groups of picture elements can be used for color television image reproduction. FIGURE 13 is a diagram of one form of color television image reproducer having a row selector circuit and also video storage circuits operatively connected according to the present invention.

A row selector circuit 71 applies threshold pulses to selected rows of the mural image reproducer 70c (the letter "c" with the numeral "70" distinguishes the color television image reproducer from the mural image reproduced of FIGURE 6).

The color television mural image reproducer 70c includes a trio of subcomponent picture elements at each picture element. Each of the trio of subcomponent picture elements uses an electroluminescent cell, one cell 50G emitting green light, one cell 50R emitting red light, and one cell 50B emitting blue light. Each electroluminescent cell is coupled to a pair of nonlinear resistances according to the arrangement shown in FIGURE 7.

The color television mural image reproducer 70c shares video storage circuits in the circuits of each of the three colors of a color image. The circuit of FIGURE 13, therefore includes six video storage circuits arranged in pairs. One pair of video storage circuits 170 (corresponding to the first video storage circuit 97 and the second video storage circuit 93 of the circuit of FIGURE 10), processes video pulses relating to green image information. A second pair of video storage circuits 171 processes video pulses relating to red image information. A third pair of video storage circuits 173 processes video pulses relating to blue image information. The color television mural image reproducer 70c operates in the manner of the circuit of FIGURE 10, whereby each of the pairs of video storage circuits applies push-pull video information to each of the subcomponent picture elements. As a result of this operation, at least one row of picture information corresponding to each of the component colors is caused to be displayed at any instant during a scanning period. It follows that the number of rows of stored image information can be increased to any practical number of rows of stored video information for each component color, using the principles described in connection with the circuit of FIGURE 12.

The color television mural image reproducer 70c may have its subcomponent picture elements, each including electroluminescent cells for emitting light at the various colors, positioned in any desired orientation which is compatible with the color information signal received. The electroluminescent cells may be arranged in any desired sequence; for example, the emitted colors may be interlaced in the sequence, green, red, blue, green, red, blue, and so on. It is also possible to vary the relative area of the light emitting areas of the subcomponent electroluminescent cells of the subcomponent picture elements to compensate for unequal color emission for given voltage excitations. Also, the number of storage circuits and subcomponent picture elements can be greater for one or two of the three component colors in order to obtain a given resolution with relatively fewer component color areas.

The color television mural image reproducer 70c in FIGURE 3 may be constructed whereby the subcomponent picture elements for each of the component colors may be staggered from row to row in order to further obtain a greater resolution for a given number of picture elements. This would require that the column be installed in a zig-zag array rather than in the "equivalent" form of straight lines as shown in FIGURE 13.

*Mural image reproducer with stored video information and using only an electroluminescent cell at each picture element*

A mural image reproducer 70 can be constructed to use only a single electroluminescent cell at each picture element located at the contiguous intersection of each column and row of a mural image reproducer. This can be accomplished with excellent contrast of a reproduced image, using shared video information storage according to the present invention, by applying large voltages to each electroluminescent cell and by employing means to minimize light output from unsettled picture elements.

FIGURE 3b is a curve which points out that an electroluminescent cell 50, used by itself, has a light output versus applied voltage characteristic which is very nonlinear; in fact, as shown in FIGURE 3b, the light output below some voltage level, say $V_1$, is of very low intensity or virtually zero. The voltage $V_1$ may be considered to be a threshold voltage which is comparable with the voltage V of a nonlinear resistance of the type shown in FIGURE 6. If only a single electroluminescent cell is used at each picture element, an advantage is derived in that the voltage drop normally lost across nonlinear impedance does not exist, and therefore the amplitude of the pulse voltage required to drive each electroluminescent cell, may be considerably reduced. However, the nonlinear light output versus applied voltage curve of an electroluminescent cell does not provide the condition of absolutely no-light output below $V_1$; therefore unless the novel apparatus of the present invention is employed, the picture contrast of an image reproduced by the mural image reproducer 70 of FIGURE 14 may be inferior to the picture contrast in the picture reproduced by the mural image reproducer of FIGURE 6 which uses a nonlinear resistance with each electroluminescent cell.

In the mural image reproducer of the present invention all of the columns are energized by one or another of the video storage circuits. During various time intervals, each of the rows of the mural image reproducer is energized or selected in such a manner that the column energization produces the desired light output from the energized or selected row. For the case where only an electroluminescent cell is used in each picture element, the light output from the unselected rows is reduced to subvisible intensity by applying energizing voltages of proper magnitude and polarity to at least each of the unselected rows; in one form of the invention, means are provided to use a large ratio of the voltage applied to the picture elements which should emit light and the voltage applied to those elements which should not emit light. For example, assume that $k$ column conductors of the mural image reproducer 70 of FIGURE 14 are energized, respectively, by the voltages $V_a$, $V_b$ ... $V_k$, with these voltages having maximum value $V_m$, let the voltage $W_s$ be the voltage applied on the selected row and $W_n$ the voltage applied to the unselected rows. The voltage $r$ on an element coupled to an unselected row and to the column on which resides the voltage, say $V_l$, is equal to $$r = V_l - W_n \tag{1}$$

where $r$ varies between $-W_n$ and $V_m - W_n$. If $W_n$ is made equal to ½ of the range of swing of the video voltage, that is, $$W_n = \tfrac{1}{2} V_m \tag{2}$$

then the absolute value of these voltages "$r$" on the unselected rows is only ½ $V_m$ instead of, for example, $V_m$. The voltage "$r$" will have a value in the range between $$\frac{-V_m}{2} \text{ and } \frac{+V_m}{2}$$

Consider now the integrated light during one frame time of a picture reproduced by the mural image reproducer 70. Consider first the extreme case in which the picture to be reproduced has maximum brightness at all picture element but one which is completely black. If the number of rows is N, the integrated light on the reproduced dark element will be:

$$(N-1)f(V_m - W_n) + f(W_s) \tag{3}$$

assuming that the integrated light produced during one horizontal row time is proportional to some function $f$ of the voltage. The first of the two terms of Relation 3 arises from the fact that the dark element is subjected during $N-1$ row-scans to the voltage $r = V_m - W_n$ and the second due to its single row scans during which it is subjected to the voltage $W_s$. The light from each of the other picture elements, that is, the bright picture elements, is $$(N-1)f(V_m-W_n)+f(V_m+W_s) \qquad (4)$$

The first term of Relation 4 is identical to that of Relation 3. The second term is much greater in magnitude than the first term for most practical cases.

The function $f$ relates the light intensity or output to the voltage. This function is illustrated in FIGURE 3b and is seen there to be a very rapidly increasing function; that is, a function of the type $KV^n$ where $K$ is a proportionality factor, $V$ is applied voltage, and $n$ can be some power between 2 and 10. Assume a typical value of $n=4$ in order to make some reasonable calculations on the optimum choices of $V_m$, $W_n$ and $W_s$. Assume first that the voltage on the unselected rows is ½ the maximum video voltage of the column buses. The light from the dark element is therefore $$(N-1)\left(\frac{V_m}{2}\right)^4 + W_s^4 \qquad (5)$$

It is reasonable to equate the two terms of this relation, that is, to require that the illumination from the dark element during the period when its row is not selected be equal to the light produced therefrom during the selection of that row. This yields:

$$W_s = \frac{1}{2}(N-1)^{\frac{1}{4}}V_m \qquad (6)$$

For a mural image reproducer having 257 rows, $$W_s = 2V_m = \tfrac{2}{3}V_0$$
$$V_m = \tfrac{1}{3}V_0$$
$$W_n = \tfrac{1}{6}V_0$$

$V_0$ is the maximum voltage on the brightest picture element, that is $$V_0 = W_s + V_m \qquad (7)$$

Under these conditions, the contrast $C$, or ratio of intensity between the brightest and dimmest element is $$C = \frac{(V_m+W_s)^4}{2W_s^4} = \tfrac{1}{2}\left(1+\frac{V_m}{W_s}\right)^4 = \tfrac{1}{2}\left[\frac{3}{2}\right]^4 = 8 \qquad (8)$$

and this value is seen to be independent of the choice of maximum voltage of operation. Similar calculations for the case where $n=8$ yields $C=128$.

It follows then that exceptionally good contrast can be obtained from a mural image reproducer wherein each picture element includes only an electroluminescent cell for the case where voltages are also applied to the nonselected rows.

The voltage $W_n$ consisting of pulses having duration intervals substantially equal to the threshold pulses applied by the row selector circuit 71 to selected row buses, can be conveniently added to the mural image reproducer 70 of FIGURE 14 using a choice of circuits. For example, all of the buses can be coupled to a common bar 180 which is coupled by way of transformer 181 to the pulser 182. The voltages $W_n$ may be applied to each of the column buses by coupling each of the column conductors to a common bus 183 which receives pulses of appropriate magnitude and duration from the pulser 182 by way of transformer 184. It is to be appreciated that the voltage $W_n$ can also be applied to either the row buses or the column buses or both, by use of circuits coupled from the pulser 182 to the row selector circuit 71 and to the first video storage circuit 97 and the second video storage circuit 93. Appropriate magnitudes of the voltage $W_n$ may also be applied simultaneously to both the row conductors and the column conductors of the mural image reproducer 70 of FIGURE 14 with, say, the voltage $W_n/2$ applied to the row buses and the voltage $W_n/2$ applied to the column buses. It is to be appreciated that when the voltage $W_n$ is applied to the column buses, the general effect is as though the video pulses varied in voltage between $$\frac{-V_m}{2} \text{ to } \frac{+V_m}{2}$$

*Mural image reproducer using an electroluminescent cell and a nonlinear dielectric at each picture element*

Mural image reproducers of the present invention may be constituted by utilizing other types of nonlinear impedances, other than nonlinear resistances, in association with each electroluminescent cell. In this section, mural image reproducer circuits utilizing an electroluminescent cell and a nonlinear dielectric at each picture element will be described.

FIGURE 15a is a diagram of a structure forming an electroluminescent cell in series with a nonlinear dielectric. The structure of FIGURE 15a consists of a sheet of glass 53 which has been coated with a film of transparent conductive coating 51. A layer of electroluminescent phosphor 55 is thereupon installed on top of the transparent conductive coating; a layer of nonlinear dielectric 191, e.g., barium titanate, is thereupon coated on the electroluminescent phosphor 55. A metallic surface 193 is coated or evaporated onto the top surface of the nonlinear dielectric 191. The dielectric constant of barium titanate increases with an increase in the magnitude of an electric field applied across the barium titanate.

Figure 15B:
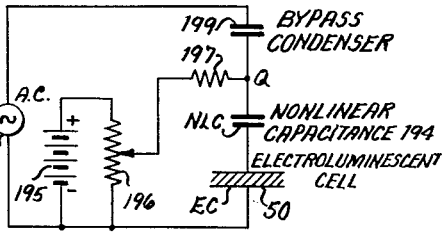

The circuit of FIGURE 15b represents an equivalent circuit wherein an electroluminescent cell 50 in series with a nonlinear capacitance 194 (as formed by nonlinear dielectric 191 of FIGURE 15a) is coupled between the point Q and ground. A battery 195 produces a direct current voltage across a potentiometer 196 whose switching arm is connected by way of the resistance 197 to the terminal Q to provide a direct current voltage (electric field) across the nonlinear capacitance 194 and the electroluminescent cell 50, with a magnitude dependent upon the position of the sliding contact of the potentiometer 196. A source of alternating current voltage, namely the source assigned the numeral 198, is coupled between ground and the point Q using a by-pass condenser 199 to isolate the direct current voltage produced at Q by way of the potentiometer 196, from the alternating current voltage source 198. Adjustment of the sliding contact of the potentiometer 196 will change the voltage and therefore the electric field across the nonlinear capacitance 194. The dielectric constant of the nonlinear capacitance 194 is thereby controllable. The alternating current source 198 will pass alternating current through the combined circuit consisting of the by-pass condenser 199 in series with the nonlinear capacitance 194 and the electroluminescent cell 50; the magnitude of the alternating current will be dependent upon the series impedance or reactance of the combined circuit. A change in the dielectric constant of the nonlinear capacitance 194 will change the reactance of that capacitance and therefore of the overall combined circuit presented to the alternating current source 198; the control of the dielectric constant and therefore of the combined reactance is achieved by controlling the sliding contact of the potentiometer 196. Since the electroluminescent cell 50 will provide light output in accordance with the voltage across this cell, it therefore follows that the controllable change of dielectric constant of the nonlinear capacitance 194 will produce corresponding changes in light output from the electroluminescent cell 50.

Figure 16A:
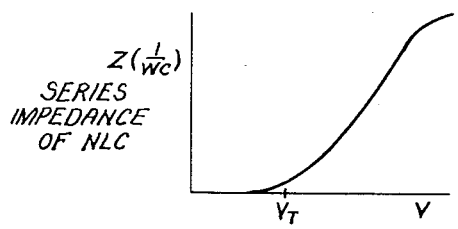
Figure 16B:
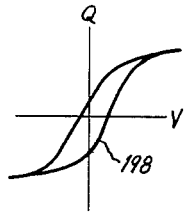
Figure 16C:
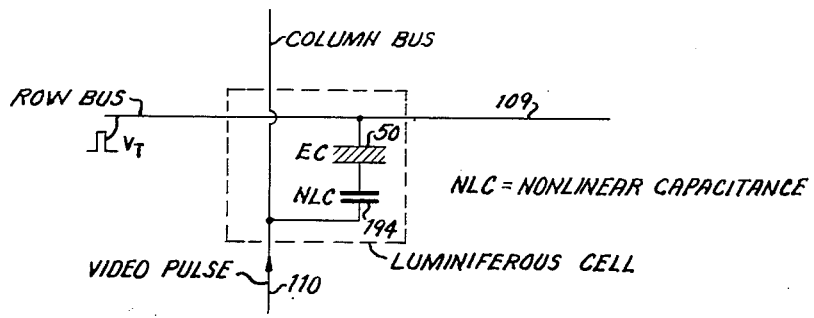
FIGURE 16c shows the arrangement of the apparatus of FIGURE 15a as an element in a mural image reproducer.

Since an electroluminescent cell is series with a nonlinear capacitance will also have a threshold voltage $V_t$, the single electroluminescent cell 50 in series with a nonlinear capacitance 194 may be used as elements of a luminiferous cell at the contiguous intersection of the column bus 110 and the row bus 109, as shown in FIGURE 16c. The threshold pulse $V_t$ is applied to the row bus 109 and the video pulse is applied to the column bus 110 in the manner described in connection with the circuit of FIGURES 5a and 6 wherein an electroluminescent cell 50 and a single nonlinear resistance 61 is included in each luminiferous cell.

Figure 16D:
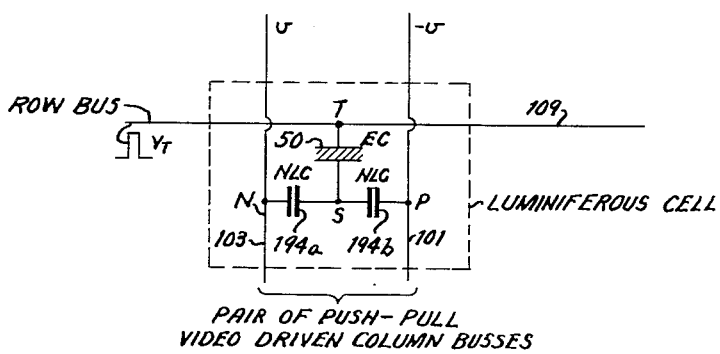
FIGURE 16d shows a push pull video driven luminiferous cell employing nonlinear capacitances.

A push-pull video driven luminiferous cell of the general type shown in FIGURES 7 and 10 may employ nonlinear capacitances rather than nonlinear resistances. A push-pull video-driven luminiferous cell employing nonlinear capacitances 194a and 194b is shown in FIGURE 16d, where it is seen that these nonlinear capacitances are connected in series between the terminals M and P on the column buses 103 and 101, respectively. An electroluminescent cell 50 is connected between the common terminal S of the serially connected nonlinear capacitances and the point T on the row bus 109. The threshold pulse $V_t$ may be applied to the row bus 109 and the video pulses $v$ and $-v$ are applied to the column buses 103 and 101, respectively, which form a pair of push-pull video driven column buses. The general behaviour of the luminiferous cell of FIGURE 16d will follow that of the two nonlinear resistances type of luminiferous cell of FIGURES 7 and 10.

FIGURE 16a is a curve of the series impedance $Z(1/\omega C)$ of a nonlinear capacitance as a function of the voltage developed across the nonlinear capacitance. The curve shows that the series impedance or reactance is substantially zero for voltage between zero and $V_t$; above $V_t$ the series impedance increases rapidly for an increase in applied voltage. $V_t$ is therefore a threshold voltage of the type discussed in connection with the nonlinear resistance circuits of this application. The curve of FIGURE 16a closely resembles the curve of FIGURE 5c which relates the current through a serially connected electroluminescent cell 50 and nonlinear resistance 61.

The shape of the curve of FIGURE 16a follows from the hysteresis curve of FIGURE 16b where it is seen that, for example, the curve 198 relating the charge Q stored, say barium titanate, to the voltage V developed across the barium titanate has the general shape of the curve of FIGURE 16a.

Figure 17:
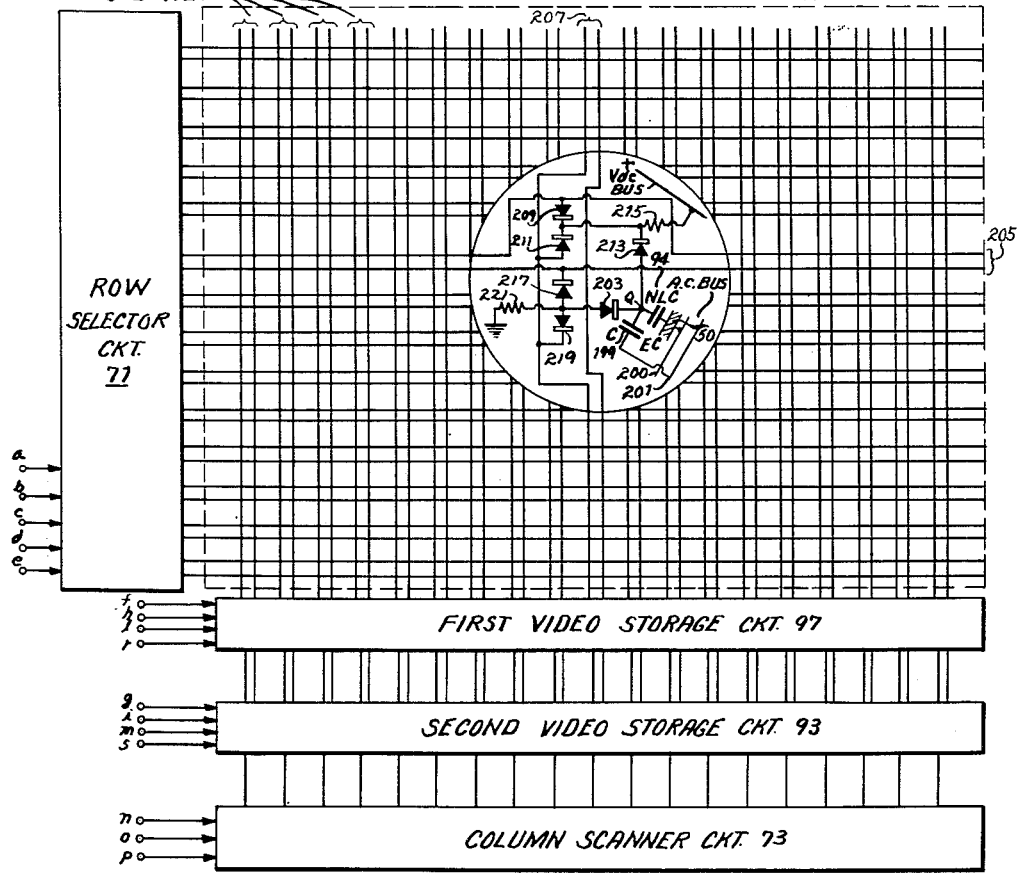
FIGURE 17 is a diagram of a mural image reproducer circuit of the present invention wherein each picture element includes a nonlinear capacitance and an electroluminescent cell.

FIGURE 17 is a mural image reproducer which employs a serially connected nonlinear capacitance (NLC) 194 and an electroluminescent cell 50 at each luminiferous cell or picture element. The picture element includes an alternative arrangement of components over the arrangements shown in FIGURES 16c and 16d to provide a feature of the invention. The circuit consisting of the serially connected nonlinear capacitance 194 and the electroluminescent cell 50 is coupled to the pair of A.-C. buses 200 and 201 using the by-pass condenser 199 and is arranged to function after the arrangement of FIGURE 16b.

In order that the electroluminescent cell at each picture element be caused to produce light in accordance with the video information corresponding to that picture element, it is important that a direct voltage of proper time duration be applied to the point Q in the connection between the by-pass condenser 199 and the nonlinear capacitance 194. One means to accomplish this is diagrammed in the circuit of FIGURE 17 wherein each column conductor and each row conductor consists respectively of a pair of column buses and a pair of row buses with the video pulses provided in push-pull on the column buses and the row selector voltages (row threshold pulses) applied in push-pull to a pair of row buses; the pair of row buses are assigned the numerals 205 and the pair of column buses are assigned the numerals 207. As is seen from the circuit in FIGURE 17, a pair of rectifiers 209 and 211 are connected in series between one of the pair of row buses 205 and one of the pair of column buses 207. The mid terminal connection of these rectifiers is coupled by way of the rectifier 213 to point Q and by way of resistance 215 to a direct current voltage bus on which is applied a direct current voltage $V_{dc}$.

In like fashion, a pair of rectifiers 217 and 219 are connected in series between the other row bus and column bus of the pair of row buses 205 and the column buses 207. The mid terminal connection of these two rectifiers is coupled to ground by way of the resistance 221 and to the point Q by way of the rectifier 203. The six rectifiers in all, connected as shown in FIGURE 17 and acting in conjunction with the capacitance C and the resistors 215 and 221, serve to detect the video pulses applied to the pair of column buses 207 and the row selector pulses applied to the pair of row buses 205 to provide a direct-current voltage across the condenser 199 and therefore the point Q which is proportional to the video information supplied to the column buses 207. The light output of the electroluminescent cell 50 will therefore depend upon that value of voltage at the point Q, in accordance with the principles of operation described in connection with the circuit of FIGURE 15b.

It is to be appreciated that the arrangement of connecting the nonlinear capacitance 194 and the electroluminescent cell 50 shown in FIGURE 17, represents a preferred but not necessarily definitive arrangement. The arrangement of FIGURE 17 has the advantage that the voltage $V_{dc}$ applied to the bus may be adjusted to control a threshold level of response of the six rectifiers so that accurate selection of each picture element upon coincidence of the video pulse supplied by the pair of column buses 207 and of the row selector pulses provided by the row buses 205, can be achieved.

The mural image reproducer of FIGURE 17 is capable of an additional feature arising from the use of the condenser 199. The direct current voltage applied to the point Q by condenser 199 in each picture element, to provide at that point a voltage indicative of the video information corresponding that picture element, may be stored in the condenser 199, for as long a time as desired. In this way, each picture element may be caused to produce a luminous display for periods of time greater than the time that the picture element circuit is subjected to row-selecting and video information indicative potentials. The luminous display from any picture element or group of picture elements may be stopped by applying a suitable pulse in one form to the $V_{dc}$ bus coupled to that element or group of elements.

Concerning the use of storage at each picture element

It is to be appreciated that the use of a condenser 199 with a sufficiently long time-constant at each picture element, will permit each picture element to store its corresponding image or video information from frame to frame. The first and second video storage circuits 97a and 93a respectively, may therefore be substituted for by a column selector and video-pulse applying circuit coupled to apply corresponding video pulses of picture-element time duration to each of the column buses of the mural image reproducer. However, the video pulse information will thereupon be required to store a corresponding charge in each of condensers 199 in the picture-element-time interval of less than a microsecond; this will require large-amplitude pulses from a column selector and video pulse applying circuit and therefore require heavy duty of such a circuit.

By using a plurality of video storage circuits to apply video information to each picture element for say, the time interval of a scanning line (64 microseconds), the condensers 199 are charged by corresponding video information pulses over a much longer period of time and the duty required of the video storage circuits is vastly reduced.

This approach also has considerable application where storage elements other than condenser elements are used at each picture element. In a mural image reproducer using a transfluxor at each picture element as described in the present inventor's previously mentioned copending application, the use of a video storage circuit of the present invention will greately reduce the duty required of driving circuits to store corresponding video information in each transfluxor.

The use of video storage circuits to provide "long energizing or charging time" operation of the storage element included in each picture element of a mural image reproducer also provides for improved operation of the mural image reproducer regardless of what type of storage elements are employed at each picture element. This improved operation is derived from the following aspects of a mural image reproducer: each column bus or conductor, to which video pulses are applied, is connected to a very large number of picture elements to form a circuit including not only many points of capacitance provided by the picture elements, but also regions of stray capacitance and inductive-reactance producing wire lengths. The result is that each column conductor or bus has the electrical characteristics of a delay line thereby making it difficult for video pulses to be applied to electroluminescent cells remote from the point of video-pulse application without time delay, and also making it difficult to produce pulses, along such a delay line, having the sharp rise time and definite amplitude characteristics indicative of the corresponding viodeo information, in only the time interval of the fraction of a microsecond corresponding to each picture-element-time in a video signal.

*Circuits for controlling a mural image reproducer of the present invention*

Representative circuits are herein described for providing the functions of column scanning, row selection, and video storage as employed in the mural image reproducers circuits described in the specification.

A circuit which performs the function called for by the column scanner circuit 73, is the magnetic shift register 250 of FIGURE 18a. The magnetic shift register 250 (that is, a typical column scanner circuit 73), includes a series of magnetic cores 251 through 258, each of which is at remanance in a normal state (N state) or in an abnormal state (P state). The line 261 passes respectively through the cores 251, 253, 255, 257, and is coupled to ground by way of resistor 263. The line 265 passes respectively through the cores 252, 254, 256, and 258, and is coupled to ground by way of resistor 267.

Consider the behavior of core 252 at a time when all of the other cores are in a normal state, and core 252 is in an abnormal state, responsive to a current pulse 268 applied to the line 261. This current pulse passes through the core 252 which is thereupon switched from the abnormal state to the normal state. A voltage responsive to the switching of core 252 from abnormal to normal state is thereupon produced in the winding 275 which is coupled to the core 252; this voltage causes the advance current $I_1$ to flow through the diode 276 and to pass through the coupling loop 277 whereupon core 253 is switched from normal state to abnormal state. The switching of core 252 also produces a voltage in the winding 279 which is coupled to core 251 by way of the diode 281. However, no current results from this voltage because of the blocking action by the diode 281; the preceding core 251 is therefore not affected. This blocking action by diode 281 is controlled by a bias voltage on the line 265 due to the voltage developed across resistance 267 by the current pulse.

The switching of core 253 from a normal state to an abnormal state in the manner previously described, produces a voltage in the winding 283; this voltage does not produce any current since diode 285 is polarized in the opposite direction thereby preventing the switching of core 253 from affecting core 254. It therefore follows that the applicaiton of the current pulse 267, at a time when all cores but core 252 are in a normal state, produces the action of switching core 252 to the normal state and core 253 to the abnormal state.

If a current pulse 269 is applied to the line 265 after current pulse 267 is applied to line 265, and if this current pulse 269 is caused to pass through the core 253 by way of the line 261, core 253 will then be switched from an abnormal state back to a normal state, with this switching action then causing core 254 to be switched from a normal to an abnormal state. By alternately applying the current pulses 267 and 269, to each of the lines 261 and 265, the various cores are successively switched from normal to abnormal states according to the switching action described in the following table wherein core 261 is referred to as core I, core 252 is referred to as core II, and so on:

| Time | Core I | Core II | Core III | Core IV | Core V | Core VI |
|---|---|---|---|---|---|---|
| $T_1$ | P | N | N | N | N | N |
| $T_2$ | N | P | N | N | N | N |
| $T_3$ | N | N | P | N | N | N |
| $T_4$ | N | N | N | P | N | N |
| $T_5$ | N | N | N | N | P | N |
| $T_6$ | N | N | N | N | N | P |

A time sequence of a starting pulse, and pulses 267 and 269 is shown in FIGURE 18b. At $T_1$, core 251 is switched to abnormal state to start a sequence by applying the starting pulse 291 to the winding 293 of core 251. At $T_2$, the current pulse 267 is produced; at $T_3$ the current pulse 269 is produced, and so on. The table shows how the switching of each core from normal to abnormal state and then back to normal state follows from core to core in the magnetic shift register 250 at a rate and sequence prescribed by the timing of the current pulses 267 and 269. When the cores 251–258 are successively switched from state N to state P, corresponding switching currents are caused to be developed in the scan buses 1–8 which are coupled to the cores 251 through 258, respectively. At the conclusion of a complete scan, all of the cores will be in state N— that is, the abnormal state and a starting pulse 291 followed by a sequence of current pulses 267 and 269 will cause the process of scanning to be repeated.

The video storage circuit, shown in FIGS. 6, 10, 12–14, and 17 of the application, wherein it is assigned either the numeral 97 or the numeral 93, either stores information relating to video information or applies the video information to the proper columns during the scanning process. One form of video storage circuit, to be described, utilizes devices known as transfluxors rather than cores. One form of transfluxor is shown in FIGURE 19a. The transfluxor comprises a core of a magnetic material such as a molded ceramic ferrospinel which has a rectangular hysteresis loop and consequently a remanant induction substantially equal to the saturation induction. The transfluxor core has two holes $H_1$ and $H_2$, which are preferably of unequal diameter with the hole (or aperture) $H_1$ being the largest. The transfluxor has three legs X, Y and Z with the leg X located to the left of the hole $H_1$, leg Y located between the holes $H_1$ and $H_2$, and leg Z located to the right of hole $H_2$ as shown in FIGURE 19a. The areas of legs Y and Z, limiting the smaller hole $H_2$ are equal and their sum is smaller than the area of leg X. Windings on the various legs may be single or multi-turn. Unlike the magnetic cores of the type used in the circuit of FIGURE 18a, these magnetic cores being capable only of on-off action, the transfluxor has the capability of providing continuous control of power to a load by proper use of control voltages which control the flux states in the various legs X, Y and Z. A detailed description of the physical and electrical characteristics is described by Rajchman and Lo in an article entitled "The Transfluxor" as published in the March 1956 issue of the "Proceedings of the IRE."

A simplified description of the operation of a transfluxor, which is described in detail in the aforementioned publication by Rajchman, is presented as follows: assume first that an intense current pulse is sent through the winding $W_{11}$ in a direction to produce a clockwise flux-flow which saturates both legs Y and Z. These legs will remain unsaturated after the elapse of the pulse since the remanant and saturated inductions are almost equal. Let an alternating current be applied through the winding $W_{12}$. This alternating current will tend to produce flux-flow around the small hole $H_2$ by way of legs Y and Z. The phase of the current tending to produce clockwise flux-flow will produce no flux change in either leg because leg Z is saturated and no further flux can flow through it. Similarly in the counter-clockwise phase, saturation in leg Y will block any possible flux change. It follows therefore that no power will be coupled from the winding $W_{12}$ to the output winding $W_{13}$ which is connected to the load L. The transfluxor is considered to be "blocked" while in this state.

Let a pulse of current be passed through the winding $W_{14}$ with a polarity tending to produce a flux-flow upward through leg Y. Flux cannot flow through leg Z which is saturated but the flux can flow through leg X. The necessary continuity of flux flow will be satisfied by an interchange of flux between legs X and Y which will leave leg X with zero flux and leg Y with an upward saturation. In this condition, the alternating current making leg Z tending to produce flux-flow around the small hole, will, in fact, produce such a flux-flow. The first counter-clockwise phase of the alternating current through the winding $W_{12}$ will reverse the direction of flux-flow, the next counter-clockwise phase will again reverse the flux-flow and so on indefinitely. An alternating current voltage will be induced in the output winding $W_{13}$ and a current will flow through the output load L. This is the "unblocked" condition of the transfluxor.

The output of the transfluxor can be set to any level in a continuous range in response to a single setting pulse which is applied through one or more of the windings through the large hole $H_1$; the level of setting will depend upon the amplitude of the setting pulse. For example, consider the condition when the transfluxor is in its "blocked" condition. Now let a setting pulse be applied to the winding $W_{11}$; this setting pulse is of opposite polarity from that of the pulse which is used to produce the "blocking." This setting pulse may alternatively be applied by another winding through the large hole $H_1$, or through a plurality of windings passing through the large hole $H_1$. A magnetizing force proportional to this current is produced around the large hole $H_1$. This force is greatest at the periphery of the hole; this force diminishes gradually with distance from the periphery. For a given amplitude of the setting current, there will be an inner zone with the magnetizing force larger than the threshold magnetizing force required to reverse the sense of magnetization, and an outer zone where this field is smaller than the threshold value. A pulse, termed a priming or prime pulse, is applied to the winding $W_{14}$ to change only that part of the flux which had been set or "trapped" into the leg Y by the setting pulse. A pulse, termed a driving or drive pulse, is thereupon passed through the winding $W_{12}$ to produce a magnetization of leg Z, in direction to saturate that leg and retransfer the trapped amount of flux back to leg Y. The succession of alternate priming and driving pulses applied to the windings $W_{14}$ and $W_{12}$, respectively, will cause interchange between the legs Y and Z to an amount of flux just equal to that amount of flux initially set into the leg Y.

FIGURE 19b is a diagram depicting typical waveforms illustrating the drive pulses and prime pulses which are applied to the windings $W_{12}$ and $W_{14}$ of the transfluxor of FIGURE 19a. In many of the circuits in which transfluxors are used have been found useful, the prime pulse is of fairly long duration and relatively small amplitude; each drive pulse follows shortly after a prime pulse, and has short duration and a compartively large amplitude.

FIGURE 19c is a characteristic curve which relates power into the load L which is coupled to the transfluxor of FIGURE 19a, as a function of the total current I passed by, say the winding $W_{11}$ of that transfluxor, through the large hole $H_1$. It is noted from the curve of FIGURE 19c that for the values of amplitude of single current pulse between zero and substantially a current $I_1$, little or no power flows into the output load L. This is due to the fact that the pulse through winding $W_{11}$ is not of sufficient amplitude to "unblock" the flux in leg Y and thereby "set" the flux in leg Y. For values of pulse amplitude greater than $I_1$, the power into the load L increases with the increase of pulse current through hole $H_1$. It is noted from the curve of FIGURE 19c that the transfluxor has a so-called "threshold" current, which must be first attained before power output and control of that power output into a load L can be achieved.

FIGURE 20a is a schematic diagram of a column scanner circuit 73 corersponding to the column scanner circuit of FIGURE 18a; the diagram of FIGURE 20a includes transfluxor type of video storage circuits representing a preferred though not necessarily definitive embodiment of these circuits. In FIGURE 20a there are included two transfluxor video storage circuits, namely the first video storage circuit 97a and the second video storage circuit 93a which provide the functions of the corresponding block diagram circuits used in the television receiver and mural image reproducer circuit of FIGURE 10.

Consider the circuit of each of the first transfluxors of these video storage circuits. The first transfluxor of the first video storage circuit 97a is assigned the numeral 301. The first transfluxor of this second video storage circuit 93a is assigned the numeral 303. The bus 305 from the first core 251 of the column scanner circuit 73 passes through the large holes of both the transfluxors 301 and 303.

Each of the transfluxors 301 and 303 is wound with four windings through which pass, when applied, the drive pulse $D_1$, the prime pulse $P_1$, the blocking pulse $B_1$ and the video pulse $V_{v1}$. The transfluxor 303 also includes four windings through which pass, when applied, the drive pulse $D_2$, the prime pulse $P_2$, the blocking pulse $B_2$ and the video pulse $V_{v2}$. In each of the transfluxors 301 and 303, the drive pulse is applied by way of a winding which passes only through the small hole, the prime pulse is applied by way of a winding which threads through the small hole back into the large hole and then on to the next transfluxor. The blocking pulse and the video pulses are passed respectively through windings which pass through the large hole of each transfluxor and the bus from the column scanner circuit also passes through the large hole of each of these transfluxors. It is noted from the circuit of FIGURE 20a that the output windings constituting the buses 311 and 313 are passed through the small holes of both transfluxors 301 and 303, to provide output signals for the corresponding column of mural image reproducer. These buses 311 and 313 are wound in opposing fashion through the various small holes of the transfluxors 301 and 303 to provide the aforementioned push-pull output operation.

Figure 20B:
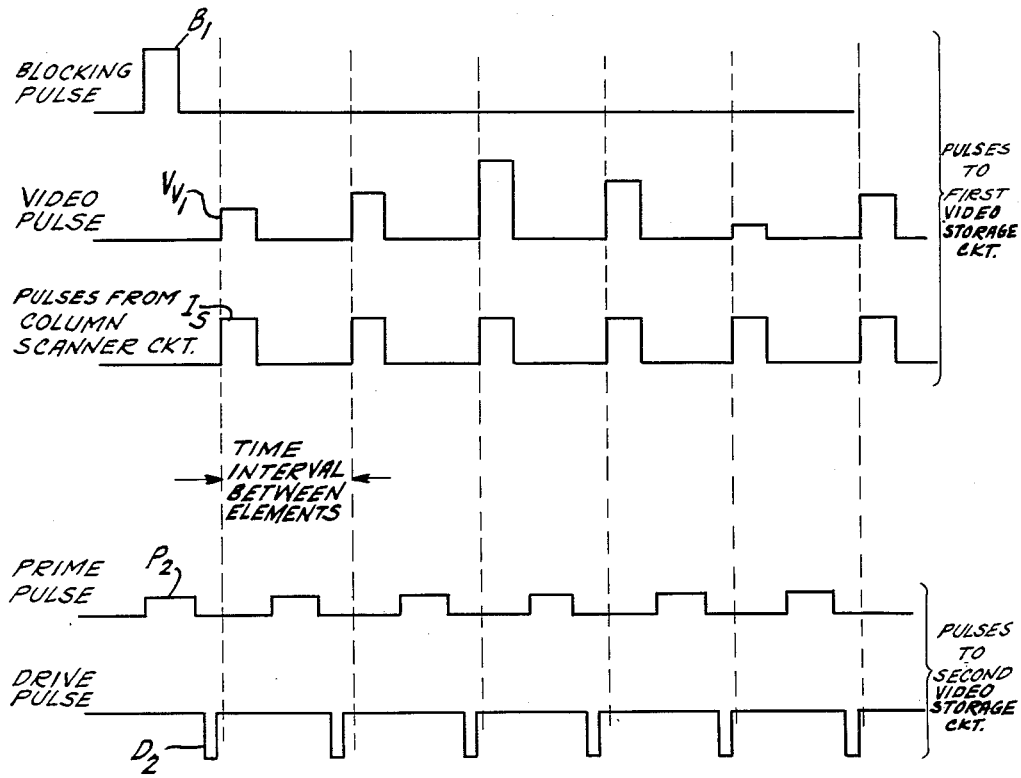

A typical sequence of operation using the pulses shown in FIGURE 20b will illustrate how the first video storage circuit 97a and the second video storage circuit 93a of FIGURE 20a operate. Consider the case where the first video storage circuit 97a is in the process of storing the video information and the second video storage circuit 93a is in the process of "reading out" or applying video information to the column buses of the associated mural image reproducer.

According to the sequence shown in FIGURE 20b, relating to the storage of video information during a scanning line, a blocking pulse $B_1$ is applied to the winding 315 which passes through the large hole of each transfluxor of the first video storage circuit 97a. This blocking pulse $B_1$ blocks each transfluxor in that circuit. Subsequent in time to the occurrence of the blocking pulse $B_1$, a pulse of current from the column scanner circuit 73 is passed successively through each of the large holes of the transfluxors of both of the storage circuits. However, after $B_1$, the transfluxors in the first video storage circuit 97a are in a blocked state. If the current from the column scanner circuit 73 is of the magnitude $I_1$ corresponding to the transfluxor threshold current, each of these transfluxors of the first video storage circuit 97a will be adjusted in sequence to the threshold level of power output; video pulses $V_{v1}$ passing on a conductor which passes through each of the large holes of these transfluxors in time coincidence with the pulses of current from the column scanner circuit 73, will thereupon set each of the transfluxors of the first video storage circuit 97a according to the video information corresponding to the amplitude of the video pulses.

During the time that the video information intended for a row controlled by the first video storage circuit 97a is being stored in the video storage circuit 97a, the second video storage 93a is reading out or applying video information energy to the various columns of the associated mural image reproducer 70. It is to be appreciated that for a mural image reproducer of the type shown in FIGURE 6 which requires video pulses of only a single polarity, only a single one of the buses 311 or 313 need be used.

During a time interval wherein video information is stored in the first video storage circuit 97a, only the blocking pulse $B_1$, the sequence of video pulses $V_1$, and the sequence of pulses $I_s$ from the scanner circuit, all shown in FIGURE 20b, are applied to that storage circuit. During the storing of video information in the first video storage circuit 97a, the drive and prime pulses, $D_2$ and $P_2$, are applied to the windings 331 and 333 which pass through the transfluxors of the second storage circuit 93a; during this storage process, the circuits which apply the blocking pulse and the video pulse to the first video storage circuit 97a are temporarily disconnected from the second video storage circuit 93a. Video information previously stored in the second video storage circuit 93a by a process similar to that described for the storage of video information in the first video storage circuit 97a, causes the energizing of each of the array of column buses according to the corresponding amount of stored video information responsive to energy provided by the prime and drive pulses $P_2$ and $D_2$.

During the next line of video information, the transfluxors of the second video storage circuit 97a are caused to be simultaneously blocked and then sequentially set according to video information applied by a sequence of video pulses similar to those applied to the first video storage circuit 97a. At the same time, the drive pulse $D_1$ and the prime pulse $P_1$ cause each of the transfluxors of the first video storage 97a to simultaneously produce push-pull power output into the column buses which pass from these transfluxors to the various column of an associated mural image reproducer 70.

While, the first video storage circuit 97a is storing video information, the second video storage circuit 93a is "reading out" previously stored video information onto the various column conductors or buses of the mural image reproducer. During the next scanning line, the roles of the two video storage circuits are reversed, with the first video storage circuit 97a caused to "read out" or apply energy, responsive to the prime and drive pulses, $P_1$ and $D_1$, to each of the column buses mural image reproducer, and during the aforementioned next scanning line, video information indicative of the next line of the video image, is stored in the second video storage circuit 93a following an initial blocking of each transfluxor in that storage circuit.

Details of typical dimensions and materials used for the transfluxors of the circuit of FIGURE 20a are presented as follows: each transfluxor is composed of RCA Laboratory material No. 302 which consists of .3 MgO, .3 MnO, and .4 $F_2O_3$. Each moulded transfluxor core is .140 inch thick. An actual transfluxor consists of a stack of such cores. The overall diameter is .345". The diameter of the large hole is .138". The diameter of the small hole is .043". The center of the large hole is located .017" from the center and the small hole is .1125" off center in the other direction. Typical windings for each transfluxor, mentioned for purposes of illustration, are described as follows: the blocking pulse winding through each transfluxor utilizes three turns. The priming pulse winding utilizes three turns; the drive pulse includes two turns. The winding coupling the video pulse to each transfluxor utilizes 10 turns. The output winding coupling the video information to each column bus utilizes 20 turns. The windings through which the row selector pulses passed each consist of 30 turns.

One operable embodiment of a row selector circuit 71 is the row magnetic shift register 390 whose schematic diagram is shown in FIGURE 21a; the operation of this circuit may be described as follows. A pair of trains of row advance pulses 391 and 392, intended for row selection, are generated at a rate and sequence conforming to the requirements of row selection of the mural image reproducer. The line 393 carrying the row advance pulse 391 passes through the large hole 394 of the transfluxor 395, through the small hole 397 of the transfluxor 399, through the large hole 401 of the transfluxor 403, and so on. The line 400 carrying the row advance pulse 392 is caused to pass through the small hole 405 of the transfluxor 395, through the large hole 407 of the transfluxor 399, through the small hole 409 of the transfluxor 403, and so on. The purpose of having the line pass through the large hole of one fluxor and then through the small hole of the succeeding transfluxor rather than through the large holes of alternate transfluxor in a manner similar to that employed in a circuit of FIGURE 18a, is to confine the change of flux due to pulses 391 and 392 to the flux path around the larger aperture. Each of the rectifiers, such as rectifier 415 or 433 provide 16 blocking functions provided by typicaly, rectifiers 276 and 281 of the circuit of FIGURE 18a.

The region of each transfluxor which provides a flux path around the large aperture, can be considered as a single core of a type shown in FIGURE 18a. The large aperture of one transfluxor is thereupon coupled to the large aperture of the next transfluxor by a coupling loop. For example, one coupling loop includes winding 396 coupling the large aperture 394 of transfluxor 395 to the large aperture of transfluxor 399, the winding 398 and the diode 415. If transfluxor 395 is considered to be in abnormal state the current flowing in this coupling loop through the large aperture of transfluxor 395, causes transfluxor 395 to be switched from abnormal state to normal state, and transfluxor 399 will be switched from normal state back to the abnormal state. The row advance pulse 392 applied to the winding 400 which passes through the small aperture of transfluxor 395, the large aperture of transfluxor 399, and so on, continues the switching process, by switching transfluxor 399 back to the normal state again switching transfluxor 403 to the abnormal state. While each transfluxor is in the abnormal state, the flux path around the small aperture of that transfluxor is unblocked and alternating current power can be transmitted through that transfluxor to the corresponding row bus coupled to that small aperture.

Shortly after each of the row advance pulses 391 and 392 are developed, a prime pulse $P_p$ is passed through all of the transfluxors by way of the line 393 which passes from the large hole to the small hole of any one transfluxor before passing on to the next large hole of the next transfluxor. The prime pulse $P_p$ sets each transfluxor so that the flux direction around the small hole of that transfluxor will be of correct polarity. A driving pulse $P_d$ will be passed through small hole 409 of transfluxor 403 and will induce current through the rectifier 421 and therefrom to the row 1 bus. The prime pulse $P_p$ and the drive pulse $P_d$ are alternately applied in a sequence shown in FIGURE 21b. The timing of the drive pulse $P_d$ to a transfluxor in an unblocked state and coupled to, say row bus 1, is in proper time coincidence with the series of video pulses, which are applied by the video storage circuits to the column buses which contiguously intersect that row bus. The energy applied to row bus 1 by the drive pulse is in the form of a pulse having an amplitude corresponding to a threshold voltage required by the devices of each picture element. After the row 1 bus has been energized, a pulse 391 switches transfluxor 431 into an abnormal state; transfluxor 431, responsive to the priming and driving pulses $P_p$ and $P_d$ thereupon energizes row 2 bus.

The row selection process is repeated until each of the rows has been energized with threshold-amplitude voltages. In an interlaced television system, the rows will be sampled in the sequence 1, 3, 5, . . . followed by the row sequence 2, 3, . . . as is employed in a normal television scanning system.

When any transfluxor in the magnetic shift register 390 is in the normal state, there is no response by that transfluxor to the driving and priming pulses applied to that transfluxor; only when the transfluxor has been switched into the abnormal state is a condition set up whereby the transfluxor is then responsive to the priming and the driving pulses.

The magnetic shift register 390 also makes provision for the fact that each of the component transfluxors may not have perfect control characteristics. Any one of the transfluxors, which is not in the abnormal state may respond to a switching pulse, such as either pulse 391 or pulse 392, to a certain extent because the saturation characteristics of one or more of the transfluxors may not be perfect. It is then possible for the operation of the row magnetic shift register 390, constituting a row selector circuit, to deteriorate, or, for the small changes in flux in successive transfluxors, to build up during the process of switching off each row so that the row magnetic shift register 390 might start to select two or more rows of picture elements at the same time. For example, a transfluxor in a normal state may switch the next transfluxor back toward abnormal state to a slight degree when hit by a pulse. This may be prevented by using magnetic cores 451 and 453 which constitute a flux absorbing mechanism between each of the transfluxors and the magnetic shift register 390. When transfluxor 403 changes from one state to another, the current is caused to pass through the line 435 which includes the rectifier 433, which is in turn coupled to ground by resistor 436; this current is also caused to pass through the large hole of the core 453 to which the row advance pulse 392 is also applied; the line 435 also passes through the large hole 457 of transfluxor 431. The core 453 will absorb any undue signal noise during the row advance pulse 391 so that this undue signal noise will not prematurely shift the transfluxor 431 to the abnormal state. The line 400 passes row advance pulse 392 through the magnetic core 453 and this pulse returns magnetic core 453 back to its original state. Currents caused to pass through the magnetic core 451 during the row advance pulse 392, will produce a current in the diode 351; this diode current will be absorbed in the magnetic core 451. The line 393 which passes through magnetic core 451 will pass the row advance pulse 391 through this core in a manner whereby the state of magnetic core 451 will be returned to the state which it occupied before the pulse 392 was applied.

FIGURE 21b shows a series of waveforms which are associated in the operation of the circuit of 21a. The first pulse produced is a row start pulse 490; shortly after the row start pulse 490, the first row advance pulse 391 is applied. During the interval between the row advance pulse 391 and the row advance pulse 392, this time interval constituting the time interval between the scanning of adjacent rows, the prime pulse $P_p$ and the drive pulse $P_d$ are produced. These prime and drive pulses, as shown in proper sequence in FIGURE 21b, are generated so that each prime pulse $P_p$ is followed by a drive pulse $P_d$. The actual amplitude of each drive pulse $P_d$ will depend upon the value of the threshold voltage required on each row bus. The frequency of the prime and drive pulses is not critical; a typical frequency is .5 mc.

It is noted from the circuit of FIGURE 21a that the first row bus is connected to the third transfluxor 403 of the row selector circuit rather than the first transfluxor; this is an alternative arrangement for connecting up a transfluxor type of row selector which has the advantage of insuring proper starting and row selection characteristics of the overall circuit before the first row bus has actually been selected.

Figure 22:
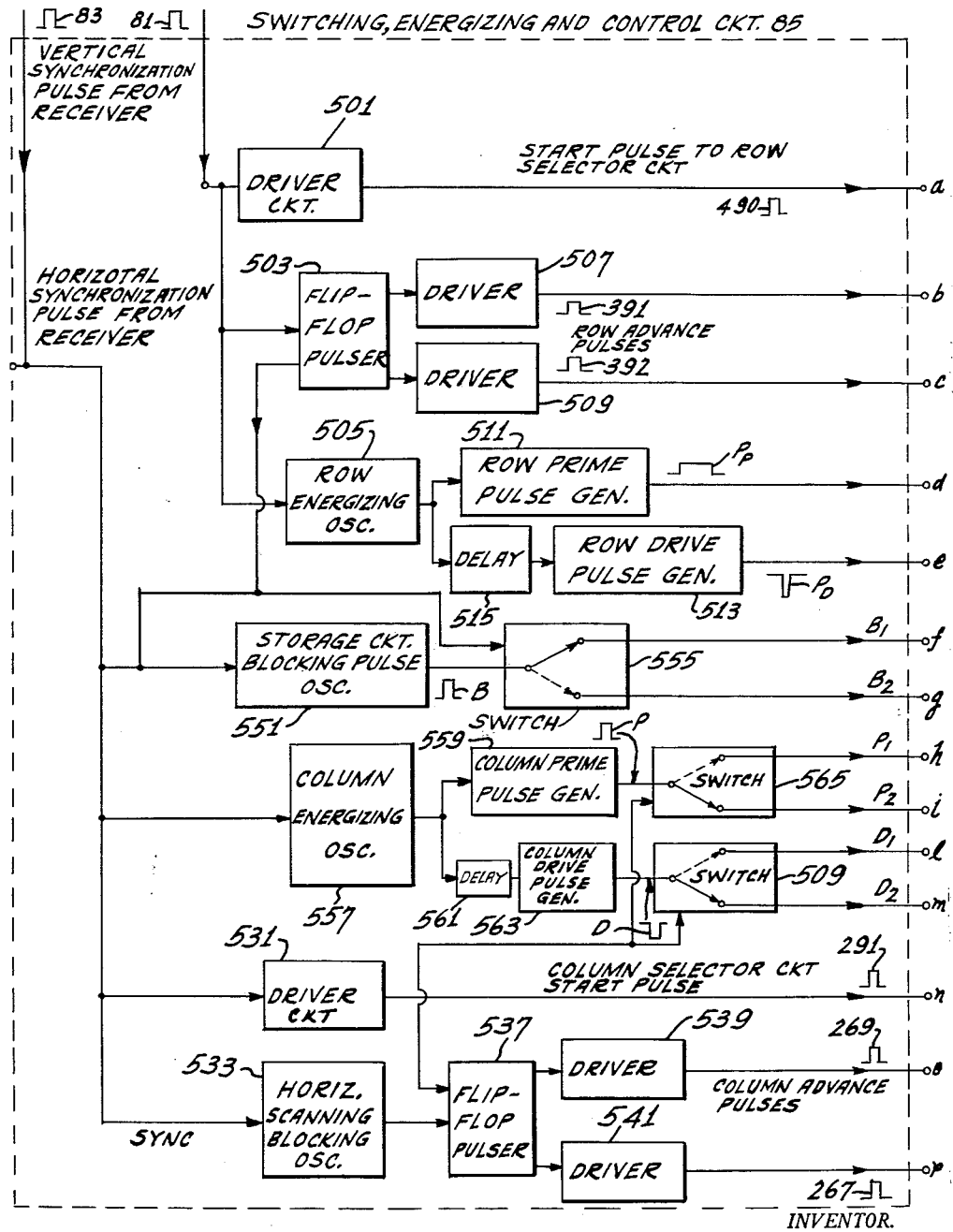
FIGURE 22 is a block diagram of one form of switching, energizing and control circuit.

FIGURE 22 is a block diagram of a typical aggregation of circuits constituting the switching, energizing and control circuit 85 of the figures of the application. The switching, energizing, and control circuit 85 of FIGURE 22 is responsive to both horizontal and vertical synchronizing pulses from the sync pulse separator. The vertical sync pulse 81 is applied simultaneously to the driver circuit 501, the flip-flop pulser 503 and the row energizing oscillator 505. The driver circuit 501, responsive to the vertical sync pulse 81, produces a start pulse 490 which is used to start the row selector circuit 71 which is diagrammed in FIGURE 21a. The flip-flop pulse 503, responsive to the vertical sync pulse 81 produces a pair of trains of impulses which are applied to driver circuits 507 and 509 to develop the row advance pulses 391 and 392 at the output terminals. These row advance pulses 391 and 392, as has been described in connection with FIGURE 21a, cause the row selector circuit 71 to select the rows of a mural image produced according to a prescribed sequence.

The row energizing oscillator 505, responsive to synchronization by the vertical sync pulse, produces an oscillatory signal which drives both the row time pulse generator 511 and the row drive pulse generator 515. The driving signals from the row energizing oscillator 505 are first delayed in the delay line 515 before being applied to the row drive pulse generator 513 so that the drive and prime pulses $P_d$ and $P_p$ will be properly spaced apart in time. The drive and prime pulses, $P_d$ and $P_p$, produced by the row prime pulse generator 511 and the row drive pulse generator 513, provide the energy which is used to cause threshold voltage pulses to be developed on each of the selected row buses of a mural image reproducer of the invention. The row prime pulse generator 511 provides the prime pulse $P_p$ to the output terminal $d$ and the row drive pulse $P_d$ to the output terminal $e$. The output terminals $a$, $b$, $c$, $d$, and $e$ of the switching, energizing and control circuit 85 correspond to the input terminals $a$, $b$, $c$, $d$, and $e$ of the circuit of FIGURE 21a.

The horizontal sync pulse 83 is applied to both a driver circuit 531 and a horizontal scanning blocking oscillator 533. The driver circuit 531, responsive to the horizontal sync pulse 83 produces the start pulse 291 of the column scanner circuit shown in FIGURE 18a. This column selector start pulse is applied to the output terminal $n$. The horizontal scanning blocking oscillator 533, responsive to the horizontal sync pulse 83, energizes the flip-flop pulse 207 which produces pulses which alternately energize the drivers 539 and 541. The output of the driver 539 is the pulse 269 which is applied to the output terminal $o$. The output of the driver 541 is the pulse 267 which is applied to the output terminal $p$. The pulses 269 and 267 are the column advance pulses of the column scanning circuit of FIGURE 18a. The output terminals $n$, $o$ and $p$ of the switching, energizing and control circuit 85, will be seen to properly correspond to the input terminals $n$, $o$ and $p$ of the column scanner circuit of FIGURE 18a.

It is seen in the television receiver circuit of FIGURE 6 that the video pulse generator 87 produces a train of video pulses which are applied to a video switch 89. The video switch 89, responsive to a vertical sync pulse 81, alternately applies the video pulses to the first video storage circuit 97 and to the second video storage circuit 93 in the circuit of FIGURE 6. It has been shown that during the time interval of the scanning of one line, the first video storage circuit 97 stores information relating to each of the video pulses for the entire scanning line; during the time that the first video storage circuit 97 is storing video pulses, the second video storage circuit 93 simultaneously "reads out" the stored video pulses to each of the column conductors or buses of the mural image reproducer 70.

During the next scanning line, the roles of the first video storage circuit 97 and the second video storage circuit 93 are reversed. The video switch 89 thereupon applies the video pulses to the second video storage circuit 93 which stores these video pulses; during this scanning line interval of time, the second video storage circuit 93 stores the incoming video pulses. The first video storage circuit 97 thereupon "reads out" the video pulse situation stored during the preceding line of video information to each of the column conductors or buses of the mural image reproducer 70.

Since the video pulses are alternately switched by the video switch 89 from the first video storage circuit 97 to the second video storage circuit 93, back to the video storage circuit 97, and so on, from line to line, the switching, energizing and control circuit 85 includes circuits for switching blocking, priming, and driving pulses, back and forth between first video storage circuit 97 and the second video storage circuit 93 as required.

The storage-circuit blocking-pulse oscillator 551, responsive to the horizontal synchronizing pulse, produces a blocking pulse prior to the scanning of each row in the mural image reproducer. This blocking pulse is assigned the letter B. The switch 555, responsive to horizontal synchronizing pulses, alternately switches the blocking pulse B from the output terminal $f$ to the output terminal $g$ and so on. The blocking pulses, which are produced alternately at the output terminal $f$ and $d$, are assigned the letters $B_1$ and $B_2$.

The column energizing oscillator 557, responsive to synchronization by the horizontal synchronizing pulses, produces oscillations at a frequency with which the driving and priming pulses are to be applied to each of the video storage circuits of the present invention. The column energizing oscillator 557 thereupon energizes the column prime pulse generator 559 and applies energy by way of the delay line 561 to the column drive pulse generator 563. The output of the column prime pulse generator is thereupon the column prime pulse P which is passed into the switch 565; this switch, responsive to the switching action by signals supplied by the flip-flop pulse of 537, alternately applies the prime pulse to each of the output terminals $h$ or $i$, depending on whether the video storage circuit 97 or video storage circuit 93 is being caused to "read out" video information to the columns of the mural image reproducer during the scanning of a particular line. The prime pulses $P_1$ and $P_2$ are thereupon produced at either of the output terminals $h$, $i$ depending on the row being selected in the mural image reproducer.

The drive pulse D from the column drive pulse generator 563 are applied to the switch 569 which, responsive to switching signals derived from the flip-flop pulser 537, alternately produces drive pulses $D_1$ at the output terminal $l$ during the scanning of one row and $D_2$ at the output terminal $m$ during the scanning of the next row.

During the time interval when one row of a mural image reproducer 70 is selected and a video switch 89, is coupled to, say, the first video storage circuit 97, the switches 555, 565, and 569 produce the blocking pulse $B_1$ at terminal $f$, the prime pulse $P_2$ at terminal $i$ and the drive pulse $D_2$ at terminal $m$. When the next row of the mural image reproducer 70 is selected and the video switch is coupled to a second video storage circuit 93, the switches 555, 565, and 569 produce the blocking pulse $B_2$ at terminal $g$, the prime pulse $P_1$ at terminal $h$ and the drive pulse $D_1$ at terminal $l$.

*A mural image reproducer with a resonant row and column bus system*

Each of the mural image reproducers of the present invention previously described in the specification have involved circuits for applying threshold or video information to each of a multiplicity of row or column buses or columns of a mural image reproducer. The circuit of FIGURE 23 includes a resonant line mural image reproducer 70r wherein the power requirement for either a row selector circuit 71 or by a video storage circuit 97 or 93 is greatly reduced.

When a single electroluminescent cell 50 is contained in each picture element, as shown in FIGURE 23, the column bus 575 and row bus 577, positioned in the $j$ column and the $k$ row, respectively, will be loaded with a capacitive load provided by the electroluminescent cell 50 and the stray capacity provided between the row bus 577 and the column bus 575 and ground. The power drive requirements of a transfluxor 579 driving the column bus 575 from the video storage circuit 97 or 93 can be reduced by including an inductance 581 in series with the column bus 575 so that the combination of the inductance 581 and the capacitance of the electroluminescent cell 50 and the stray capacitance of both the column bus 575 and the circuits associated with the row bus 577, resonates at the frequency of the video pulses applied to the row bus 577 by the transfluxor 579.

In like manner, the inductance 585 may be included in the circuit of the row bus 577 to resonate with the stray capacitance of that row bus 577, the capacitance of the electroluminescent cell 50 and the capacitance of the circuit associated with the column bus 575 at a corresponding frequency. The row $k$ bus 577, as is seen from the circuit of FIGURE 23, is driven by a transfluxor 591 according to an arrangement described in the row selector circuit of FIGURE 21a.

A mural image reproducer using a resonant row and column bus system requires a driving or energizing source to furnish only a real component of power to overcome the losses of the electroluminescent cells, the connecting buses and the driving transfluxors; the real component of power in such a circuit is considerably smaller than the reactive component of power also present.

It is further noted from the circuit of FIGURE 23 that a "contrast-increasing" voltage to a non-selected row for use in a circuit of the type shown in FIGURE 14 may be introduced into each of the row buses of the resonant line mural image reproducer 70r or for that matter, of any mural image reproducer 70r of the present invention, by applying suitable pulses to a series of transformers each coupled to a row bus of the mural image reproducer; for example, transformer 593 has a secondary winding connected in series between the winding of the row bus 577, after it passes through the small hole of the transfluxor 91, and ground.

*A mural image reproducer using a single video storage circuit*

The mural image reproducer circuits previously described in this application have used two or more video storage circuits, each of which shares the function of storing video information intended for rows of the mural image reproducer, according to the present invention. A mural image reproducer circuit can be operated using only a single video storage circuit which is used to share the function of storing the video information corresponding to a portion of one row, and a related portion of an adjacent row.

One mode of operation of a mural image reproducer using only a single video storage circuit of the present invention is described as follows: if a first row of a mural image reproducer has $n$ elements, that is, 1, 2, 3, ... $n$ elements, the video information corresponding to each of these elements is used to energize or cause each element to produce a corresponding luminosity during the scanning of that row. At the conclusion of the scan of that row, all elements of that row are luminous (provided that the video information corresponding to that row is for other than black information).

Let the second row have corresponding elements 1, 2, 3, ... $n$. During the start of the scanning of the second row, each element of the first row is de-energized and each element of the second row is initially energized with the information previously displayed by the corresponding element in the first row.

When the scanning of the second row explores the first element in that row, this first element is de-energized with respect to the first row information and is energized with video information intended for the first element of the second row. When the second element of the second row is energized, the "first row" information is removed from the second element, and that element is caused to become luminous according to video information intended for that second element of the second row.

It then follows that when the $m^{th}$ element of a row is energized, the elements 1, 2, ... $m$ are luminous with video information intended for those elements in that row and the elements, $m+1$, $m+2$, ... $n$ of that row are luminous with video information intended for the corresponding elements of the preceding row. At the conclusion of the scanning of a row, all elements of that row are luminous according to video information intended for each element in that row.

A single storage circuit providing the above operation will therefore store video information and provide energization to corresponding groups of elements on each row of a mural image reproducer. It follows that at any instant during the energizing of the elements of a mural image reproducer operating as described, a number of elements, equal in number to the number of elements included in each row, is always caused to be luminous.

A typical mural image reproducer circuit for providing the above described operation is shown in FIGURE 24. This mural image reproducer circuit includes the mural image reproducer 70 and a row selector circuit 71. The row selector circuit 71 selects each of the rows of the mural image reproducer 70. A video storage circuit 601 operating in combination with a column scanning circuit 73 selects each of the columns of mural image reproducer 70. The picture elements at the contiguous intersections of each of the row and column conductors of the mural image reproducer 70 will become energized upon coincidence of a threshold pulse provided by the row selector circuit 71 and a video pulse provided by the video storage circuit 601.

The video storage circuit 601 and the column scanning circuit 73 include schematic diagrams of core and transfluxor types of circuits which can accomplish the functions of the present invention. The video storage circuit 601 includes a series of transfluxors which have in common, a prime pulse winding 603 and a drive pulse winding 605. Column conductors are coupled to the small holes of corresponding transfluxors. The column scanning circuit 73 uses a circuit identical to that described in FIGURE 18a, with the exception of the fact that unlike the circuit of FIGURE 18a which selects a column for each of the cores, the column scanning circuit 73 of FIGURE 24 has two cores associated with each of the transfluxors of the video storage circuit 601. A column advance and blocking pulse 607 is applied to one lead 261 of the column scanning circuit 73. A column advance and video pulse 609 is applied to the lead 265 of the column scanning circuit 73. The column advance and blocking pulse 607 and the column advance and video pulse 609, produced in sequence, will sequentially switch each of the cores from one state to another, therfeore providing a scanning operation so uniquely performed by this type of circuit.

The column scanning circuit 73, as connected, not only scans, but also blocks the transfluxors of the video storage circuit 601 and sets each of these transfluxors with corresponding video information. These functions are accomplished with transfluxor 619 by using the winding 611, coupled to core 613 and the winding 615 coupled to core 617; each of the windings 611 and 615 are wound through the large hole of the transfluxor 619. Because of this type of connection, the column advance and blocking pulse 607 both switch the state of core 613 and induces a blocking pulse in the transfluxor 619, to both erase the stored information in transfluxor 619 and to ready transfluxor 619 to a condition whereby it can be set. Shortly after the occurrence of the column advance and blocking pulse 607, the column advance and video pulse 609 occurs. The column advance and video pulse 609 switches the state of the core 617, and induces into the transfluxor 619 a setting pulse which is proportional to the video information at that instant. Thereupon, the prime and drive pulses applied to the respective windings 605 and 603 of the transfluxor 619 induce corresponding video information to the column conductor 625. If row conductor (bus) 633 is at that time energized by threshold pulses provided by the row selector circuit 71, the picture element 631 at the contiguous intersection of column conductor 625 and the row conductor 627 will be energized. It is to be appreciated that if the row selector circuit 71 then selects row conductor 627 while the transfluxor 619 is still applying video information to the column conductor 625, the picture element 629 coupled to that row conductor 627 will become energized and therefore luminous in accordance with the video information stored in the transfluxor 619.

Consider by way of illustration of the operation of the circuit of FIGURE 24, a typical sequence of operations performed by this circuit, assume that at some instant the row selector applies threshold pulses to the row conductor 633 and that the video storage circuit 601 has energized each of the column conductors of the mural image reproducer 70 to thereby cause each element along that row to become luminous according to corresponding video information. This instant corresponds to time of the conclusion of the scanning of the picture elements along row conductor 633; all picture elements along that row are luminous at that instant.

Shortly after the last named instant, the scanning of the picture elements along the next selected row conductor 627 begins. The row selector circuit 71 applies threshold pulses to the row conductor 627; the picture elements along row conductor 633 cease being luminous, and all picture elements along row conductor 627 become luminous according to video information stored in the transfluxors of the video storage circuit 601 during the scanning of the picture elements of row conductor 633.

As the scanning of the picture elements along row conductor 627 proceeds from picture element to picture element, the video information previously stored in each of the transfluxors of the video storage circuit 601 is, in sequence from transfluxor to transfluxor, replaced by the video information relating to the row being scanned. Therefore, during the scanning of the picture elements along row conductor 627, each picture element is successively caused to cease displaying light at an intensity relating to the video information of the preceding scan and to commence displaying light at an intensity related to the video information intended for that picture element in the presently-scanned row. At the conclusion of the scan, all picture elements will be luminous in accordance with the video information intended for that row.

By using a sufficiently large number of rows, distortion of the reproduced image arising from the displaying of the same luminous information of adjacent rows, will become negligible and a considerable increase in picture brightness and a reduction in circuit complexity is realized.

*Other aspects of the invention*

The preceding description has discussed the employment of electroluminescent cells for converting electric energy into luminescence. It is to be appreciated, however, that other methods of conversion of electrical energy into control of production of light are possible. Several of these methods involve the use of:

(A) The quenching effect of an electric field on certain ultra-violet light excited electroluminescent bodies;

(B) Incandescent lights;

(C) Heat quenching on ultra-violet light excited phosphors;

(D) Phosphors which may be excited with radio-active materials and then selectively heat quenched by use of elemental-area driving devices;

(E) Mechanical motion of a mechanical light valve— for example, flat aluminum flakes suspended in oil can block light transmission when oriented by an electric field so that the flakes are perpendicular to the light while good light transmission prevails when the electric field orients the particles along the light rays;

(F) Mechanical motion of a macroscopic nature— for example, flaps in a metal sheet which can be moved by electrostatic or magnetic forces.

(G) Gas discharge tubes.

It is also to be appreciated that the present invention has utility in a far broader field than for television image reproduction. Display devices according to the present invention may be used for many types of image or pattern displays. Some of these applications can be found in the:

(A) Field of radar information representation and storage;

(B) P.P.I. radar scanning information representation and storage;

(C) Computer display applications involving, for example, low resolution and high storage;

(D) Industrial television where, for example, for a coarse image involving a slow rate of scanning may be employed;

(E) The transmission of, for example, a newspaper page during each scan utilizing very low frequency scanning rates and the storage capabilities of the present invention;

(F) Stereoscopic representation where, for example, adjacent elemental areas may be caused to produce light in prescribed planes of polarization to correspond to a plurality of individual images of a stereoscopic image, with suitable viewing means such as Polaroid glasses then utilized for the reconstruction of the stereoscopic image;

(G) A "z" axis or "3D" array of elements where the elemental light emitting areas are installed in more than one plane;

(H) An image reproducer where half-tone reproduction is not desired, only "on-off" control at each elemental area. This may be accomplished by controlling each pulse, previously described as a video pulse, between either of two levels corresponding to the "on" or "off" position of the light emitting area. Other methods involving mechanism for blocking or unblocking the various transfluxor may be utilized.

(I) Illustration or pattern display devices wherein the rows and columns can be triggered or controlled according to any desired pattern or sequence to produce light patterns in a manner differing from television scanning procedures.

A mural image reproducer according to the present invention has certain structural advantages; for example, the image reproducing surface may be thin but not necessarily flat. This image reproducing surface may be constructed in accordance with any contour or geometrical surface which is most suitable for the type of image or pattern to be reproduced. The present invention is also uniquely suited for radar applications where the image reproducing surface is substantially circular and wherein one scanning path is in a radial direction and a second scanning path is in azimuthal direction. The present invention may also be utilized in radar utilizing an essentially circular pattern reproducing area wherein the elemental light reproducing areas are aligned in a long spiral path starting from the center and ending at the outer periphery to form a scanning path which does not involve both rows and columns but what is actually a very long row.

It is to be appreciated that the mural image reproducer according to the present invention may be operated in conjunction with many of several types of signals different and distinct from a standard television signal. An image of any desired nature may be produced by a suitable signal producing device on a mural image reproducer provided that such a signal causes the mural image reproducer to be responsive to at least signals indicating where light is to be produced and signals indicating how much light is involved at elemental areas.

Mural image reproducers according to the present invention are also particularly suitable for large-area reproduction of information; more than one information signal can be applied to such an image reproducer to cause the simultaneous display of a plurality of sets of information. For example, a mural image reproducer used for radar-information display, may be operatively connected to simultaneously display radar information from a plurality of radar systems.

Having described the invention, what is claimed is:

1. In combination, a luminous image display system including an image reproducer having a plurality of groups of picture elements each capable of luminous output with controllable intensity, a circuit to provide a sequence of image information signals, each signal of said sequence having prescribed timing and representative of the luminosity required of a picture element of an image, a second circuit to provide timing and energizing waveforms related in timing to the timing of said image information signals, signal storage and applying means adapted to be coupled to different ones of said groups of picture elements, said signal storage and applying means being fewer in number than said groups of picture elements and responsive to said image information signals and to said timing and energizing waveforms to first store image information intended for each picture element of a group and to then apply said stored image information to a picture element group while said signal storage and applying means is coupled to said picture element group, whereby each of said groups of picture elements is caused to become luminous in accordance with corresponding stored image information.

2. In combination, an electrical display array including a plurality of elemental-luminescent areas capable of controllable light output, means for developing a first set of signals representative of the location of each elemental area, means for developing a second set of signals indicative of the information to be displayed at each elemental area, means to successively store less than complete portions of said second set of signals, said last-named means including means operable while each of said portions is being stored to apply both said first set of signals and a previously stored portion of said second set of signals to said array to cause illuminated display from each elemental luminescent area according to the information to be displayed at that area.

3. In combination, a circuit to provide a set of signals, each of said set of signals representative of information relating to a corresponding elemental area of an image; a signal utilization means; means to successively store less than complete portions of said set of signals, said storage means including means operable while each of said portions is being stored to apply a previously stored portion of said set of signals to said signal utilization means.

4. In combination, an electrical display array including a plurality of luminescent elemental areas, each element area including an electroluminescent cell in series with at least one non-linear device, means for developing a first set of signals representative of the location of each luminescent elemental area, means for developing a second set of signals indicative of video information to be displayed at each luminescent elemental area, means to successively store less than complete portions of said second set of signals, said last-named means including means operable while each of said portions is being stored to apply both said first set of signals and a previously stored portion of said second set of signals to energize groups of luminescent cells in selected locations in said array and alter in succession the location of each of said groups until all luminescent cells in said array are caused to display luminous information according to the video information to be displayed at that area.

5. In combination, a luminous image display system including an image reproducer having a plurality of groups of picture elements each capable of luminous output with controllable intensity, a circuit to provide a sequence of image information signals, each of said sequence representative of the luminosity required of a corresponding picture element, a second circuit to provide synchronizing waveforms related to the timing of said sequence of image information signals, storage circuit means fewer in number than said groups of picture elements and responsive to said image information signals and to said synchronizing waveforms to successively perform the function from one picture element to another in a group of picture elements of first storing image information corresponding to a picture element and then causing a luminous display from that picture element in accordance with said stored image information.

6. An image display device for producing a luminous image or pattern in accordance with electrical signals comprising, an array of individually controllable luminescent elements, a plurality of groups of control devices capable of storing electrical signal information over a continuous range of values, means to cause a first group of said control devices and a second group of said control devices to alternately store electrical signal information and to apply stored electrical signal information to selected groups of said luminescent elements during prescribed intervals of time occurring in sequence.

7. In combination: a mural image reproducer having picture elements arranged in rows and columns, each of said picture elements capable of light output of controllable intensity; a circuit to provide a sequence of electrical signals in a plurality of discrete sets per picture, each signal representative of information related to the desired light output of a corresponding picture element; an electrical signal storage circuit responsive to said sequence of electrical signals and capable of storing sets of said electrical signals and of reading out said stored sets of said electrical signals, the number of said stored sets of electrical signals being less than the number of sets of electrical signals representative of a complete picture; means to connect said electrical signal storage circuit to said columns of picture elements; and means to cause said electrical signal storage circuit to be shared between rows of said picture elements to energize each of said rows of picture elements with a corresponding stored set of electrical signals and then read-out.

8. In combination; an electrical display device including an array of luminescent cells, each cell of said array capable of light output of controllable intensity and including a storage device capable of storing an applied electrical signal and maintaining light output from that cell at an intensity related to said stored electrical signal; a circuit for providing a sequence of electrical signals each representative of the desired intensity of light output of a corresponding cell in said array; a storage circuit to store a number less than the total number of luminescent cells in said array of said sequence of electrical signals; and means to apply said stored number of electrical signals to the storage devices of an equal number of said luminescent cells to produce light output from these luminescent cells at an intensity related to said stored number of electrical signals.

9. In combination; an electrical display device including an array of luminescent cells, each of said luminescent cells capable of light output of controllable intensity and including a storage device capable of storing an applied electrical signal and maintaining light output from that cell at in intensity related to said stored electrical signal; a circuit for providing a sequence of electrical signals in a plurality of separate sets, each signal representative of the desired intensity of light output of a corresponding luminescent cell in said array; storage circuit means to cause different and less than said plurality of sets of said sequence of electrical signals to be stored in a prescribed order and to cause the storage devices included in different sets of luminescent cells in said array to also store the corresponding stored sets of electrical signals stored in said storage circuit means whereby each of said different sets of luminescent cells produce light output at intensities corresponding to the electrical signals stored in said last named storage devices.

10. A display device for producing an image comprising, a plurality of light-emitting elements arranged in rows and columns, each of said light-emitting elements including an electro-luminescent cell in series with a nonlinear resistance, a first set of non-intersecting conductors each coupled to each element in a corresponding row of said elements, a second set of non-intersecting conductors, each of which is coupled to each element in a corresponding column of elements, means for sequentially applying control signals to the conductors of said first set to effect a selection of said light-emitting elements by rows, means for applying corresponding information signals to the conductors of said second set to control the light output of each of said elements in accordance with the image information corresponding to that element responsive to the coincidence of said first control signal and said information signal in the conductors coupled to that element.

11. In combination; an image reproducer having a first set of conductors arranged relative to a first dimension of said image reproducer and a second set of conductors arranged relative to a second dimension of said image reproducer, said second set of conductors positioned with respect to said first set of conductors to form intersections of said first and second sets of conductors, means to connect a nonlinear resistance in series with an electroluminescent cell between each of said first and second sets of conductors at each intersection, said nonlinear resistance having a threshold voltage which must be exceeded before current of an usable magnitude will pass through said nonlinear resistance, a first circuit to develop synchronizing pulses and also threshold amplitude pulses of a first duration in a selected sequence, a econd circuit means to supply video pulses of a second duration each having an amplitude relating to image information corresponding to the location of one of said intersections of said image reproducer during a scanning period, means to apply said threshold amplitude pulses from one to another of said first set of conductors in a first sequence, storage circuit means capable of simultaneously storing image information relating to one group of intersections and applying previously stored image information relating to another group of intersections to said plurality of second conductors, means responsive to said synchronizing pulses and to said pulses of a second duration to cause said storage circuit means to drive each of said plurality of second conductors to energize and produce a luminous display from selected luminescent cells at intersections with stored information corresponding to those intersections responsive to threshold amplitude pulses also produced at those intersections by way of the corresponding conductor of said plurality of first conductors and to also store image information intended for another set of cells in another location, the location of the selected cells which are energized by said storage circuit means being changed at intervals responsive to the applying of said threshold amplitude pulses from one to another of said plurality of first conductors in a sequence.

12. In combination, an array of conductors including a plurality of first conductors arrayed in one direction and a plurality of pairs of second conductors arrayed in a second direction and contiguous with said plurality of first conductors to form a group of intersections, each comprising the intersection of one of said first conductors and a pair of said second conductors, means to connect a pair of nonlinear resistances in series between said pair of second conductors at each of said intersections, said pair of nonlinear resistances having threshold voltages which must be exceeded before current of usable magnitude will pass through said nonlinear resistances, means for connecting an electroluminescent cell from the common connection between said serially connected nonlinear resistors and the first conductor at each intersection, a circuit to develop synchronizing pulses and also threshold amplitude pulses of a first duration in a selected sequence, circuit means to develop pulses of a second duration each having an amplitude relating to image information corresponding to the location of one of said intersections, means to apply said threshold amplitude pulses from one to another of said plurality of first conductors in a sequence, storage circuit means capable of simultaneously storing image information relating to one group of intersections and applying previously stored image information relating to another group of intersections to said plurality of second conductors, means responsive to said synchronizing pulses and to said pulses of a second duration to cause said storage circuit means to simultaneously drive one set of pairs of second conductors in push-pull to energize and produce a luminous display from selected luminescent cells at intersections with stored information corresponding to those intersections responsive to threshold amplitude pulses also produced at those intersections by way of the corresponding conductor of said plurality of first conductors and to also store image information intended for another set of cells in another location, the location of the selected cells which are energized by said storage circuit means being changed at intervals responsive to the applying of said threshold amplitude pulses from one to another of said plurality of first conductors in a sequence.

13. In combination, an electrical display array including a plurality of luminescent elemental areas, each elemental area including an electroluminescent cell in series with at least one nonlinear device, means for developing a first set of signals representative of the location of each luminescent elemental area, means for developing a second set of signals indicative of video information to be displayed at each luminescent elemental area, means to successively store portions of said second set of signals, said last named means including means operable while each of said portions is being stored to apply both said first set of signals and a previously stored portion of said second set of signals to energize groups of luminescent cells in selected locations in said array and alter in succession the location of each of said groups until all luminescent cells in said array are caused to display light information according to the video information to be displayed at that area.

14. In combination, an image reproducer having a first set of conductors arranged relative to a first dimension of said image reproducer and a second set of conductors arranged relative to a second dimension of said image reproducer, said second set of conductors positioned with respect to said first set of conductors to form intersections of said first and second sets of conductors, a plurality of picture elements, each comprising means including a nonlinear capacitance in series with an electroluminescent cell and coupled between selected ones of said first and second sets of conductors forming a contiguous intersection, a circuit to develop first pulses of a first duration and a selected sequence, a second circuit means to supply synchronizing and energizing pulses and also a train of second pulses, each of said second pulses having an amplitude relating to image information corresponding to the location of one of said contiguous intersections of said image reproducer, means to apply said first pulses from one to another of said first set of conductors in a first sequence, storage circuit means capable of simultaneously storing image information relating to one group of intersections and applying previously stored image information relating to another group of intersections to said second set of conductors, means responsive to said synchronizing and energizing pulses and to said second pulses to cause said storage circuit means to drive said second set of conductors to energize and produce a luminous display from selected luminescent cells at intersections with stored information corresponding to those intersections responsive to said first pulses also produced at those intersections by way of a corresponding conductor of said first set of conductors and to also store image information intended for another set of cells in another location, the location of the selected cells which are energized by said storage circuit means being changed at intervals responsive to the applying of said first pulses from one to another of said first set of conductors in said first sequence.

15. In an electrical circuit adapted to receive video information corresponding to each line of a scanned image, the combination of: an electrical display device having rows of picture elements, each picture element capable of light output of controllable intensity; and means including video information storage means fewer in number than said rows of picture elements to cause each row of picture elements of said electrical display device to first display video information related to one line of said scanned image and to then display video information related to the next line of said scanned image.

16. In combination, an image reproducer including picture elements arrayed in rows and columns, each of said picture elements capable of producing light output of controllable intensity, a circuit to provide a sequence of image information signals, each of said sequence of image information signals representative of the information at a corresponding picture element of said image reproducer, a second circuit to provide synchronizing signals relative to the timing of said sequence of image information signals, and means to energize each row of said image reproducer responsive to timing provided by said synchronizing signal, said energizing means including means during the energizing of one row to first energize and sustain light output from each picture element along that row with image information corresponding to picture elements of a preceding row and to then in sequence de-energize the previous row image information from each picture element and to re-energize each picture element according to image information intended for that picture element in that row.

17. In combination, an image reproducer having a first set of conductors arranged relative to a first dimension of an image reproduced by said image reproducer, and a second set of conductors arranged relative to a second dimension of said image and positioned to form contiguous intersections of said first and second sets of conductors, and an electroluminescent picture element at each contiguous intersection, each electroluminescent picture element capable of controllable light intensity and including capacitance reactance; a circuit means for producing a first train of waveforms having a first frequency, and a second train of waveforms having a second frequency, said first and second trains of waveforms when occurring in coincidence developing a combined waveform indicating both the location of an intersection and of the light intensity required at that intersection; means to apply selected ones of said first and second trains of waveforms to each conductor of selected conductors of said first and second sets of conductors in prescribed sequence to cause the combined waveform developed by the coincidence of said first and second trains of waveforms at the electroluminescent cell at each intersection to produce light of intensity prescribed by the corresponding waveform in said second train of waveforms; and reactance circuit means included with selected ones of said first and second sets of conductors to produce resonance in combination with said electroluminescent picture element coupled to that conductor at a frequency related to the frequency of the wave train of waveforms applied to the corresponding sets of conductors to reduce the driving power required of said circuit means applying said wave train of waveforms to said set of conductors.

18. In combination, a mural image reproducer having picture elements arranged in rows and columns, each of said picture elements capable of light output at a controllable intensity and capable of being selected for energizing by rows, a circuit for providing a sequence of image information waveforms and synchronizing signals relating to a transmitted image, a pair of signal storage and applying circuits, each capable of storing a sequence of said waveforms and then applying said stored waveforms to said columns of picture elements to energize the picture elements of a selected row, and means responsive to said sequence of waveforms and synchronizing signals to alternately couple said first and second signal storage and applying means from row to row of said rows of picture elements by selecting rows of picture elements in a prescribed order while either of said pair of signal storage and applying circuits is applying stored waveforms to the columns of picture elements and to cause one of said pair of signal storage and applying circuits to apply stored waveforms to the corresponding picture elements of one row while the other of said first and second storage and applying circuits is storing waveforms related to picture elements in the next row.

19. In combination, a mural image reproducer having picture elements arranged in rows and columns, each of said picture elements capable of light output at a controllable intensity and capable of being selected for energizing in rows, a circuit for providing a sequence of video signal waveforms and synchronizing signals relating to a transmitted image, a plurality of signal storage and applying circuits, each capable of storing a sequence of said waveforms and then applying each of said stored waveforms to said columns of picture elements to energize the picture elements of a selected row, and means responsive to said sequence of video signal waveforms and synchronizing signals to couple each of said plurality of signal storage and applying means in a prescribed sequence to selected rows of picture elements by selecting rows of picture elements in a prescribed order while any group of said plurality of signal storage and applying circuits is applying stored waveforms to the columns of picture elements and to cause some of said groups of said plurality of signal storage and applying circuits to apply stored waveforms to the corresponding picture elements of corresponding rows while another of said two groups of said plurality of storage and applying circuits stores waveforms related to picture elements in the next rows to be energized.

References Cited in the file of this patent

UNITED STATES PATENTS

| | | |
|---|---|---|
| 2,170,167 | Tarbox | Aug. 22, 1939 |
| 2,201,066 | Toulon | May 14, 1940 |
| 2,558,019 | Toulon | June 26, 1951 |
| 2,595,617 | Toulon | May 6, 1952 |
| 2,670,402 | Mark | Feb. 23, 1954 |
| 2,694,785 | Williams | Nov. 16, 1954 |
| 2,721,950 | Piper et al. | Oct. 25, 1955 |
| 2,774,813 | Livingston | Dec. 18, 1956 |
| 2,795,731 | Aiken | June 11, 1957 |
| 2,809,316 | Jeges | Oct. 8, 1957 |
| 2,818,531 | Peek | Dec. 31, 1957 |
| 2,840,741 | Lehman | June 24, 1958 |
| 2,842,755 | Lamy | July 8, 1958 |
| 2,877,371 | Orthuber | Mar. 10, 1959 |
| 2,904,626 | Rajchman | Sept. 15, 1959 |
| 2,917,667 | Sack | Dec. 15, 1959 |

OTHER REFERENCES

Serial No. 108,062, Toulon (A.P.C.), published May 18, 1943.